US010845872B2

(12) United States Patent
Kondo et al.

(10) Patent No.: US 10,845,872 B2
(45) Date of Patent: Nov. 24, 2020

(54) EYE-GAZE TRACKER, EYE-GAZE TRACKING METHOD, AND RECORDING MEDIUM

(71) Applicant: Ricoh Company, Ltd., Tokyo (JP)

(72) Inventors: Hiroshi Kondo, Kanagawa (JP); Yohei Shiren, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/266,139

(22) Filed: Feb. 4, 2019

(65) Prior Publication Data
US 2019/0250707 A1    Aug. 15, 2019

(30) Foreign Application Priority Data

Feb. 9, 2018   (JP) .................................. 2018-022393
Nov. 9, 2018   (JP) .................................. 2018-211766

(51) Int. Cl.
*G06F 3/01*  (2006.01)
*H04N 5/33*  (2006.01)
(Continued)

(52) U.S. Cl.
CPC .......... *G06F 3/013* (2013.01); *G02B 27/0093* (2013.01); *G02B 27/017* (2013.01);
(Continued)

(58) Field of Classification Search
CPC .............. G02B 27/017; G02B 27/0179; G02B 2027/014; G02B 2027/0187; H04N 5/33; G06F 3/013
See application file for complete search history.

(56) References Cited

U.S. PATENT DOCUMENTS 5,256,562 A * 10/1993 Vu .................... A61B 3/113
438/28
2007/0069209 A1* 3/2007 Jeong ................ H01L 29/78621
257/57
(Continued)

FOREIGN PATENT DOCUMENTS

JP        5-143274       6/1993
WO   WO2012/126810 A1   9/2012

OTHER PUBLICATIONS

Tadanori Sugino, et al., "Development of Defect Inspection Method with Function to Determine Concavity and Convexity Using Patterned Panel Illumination" Academic Lecture meeting Journal of the precision engineering society at the spring meeting in 2005, p. 423-424.(with English Abstract).
(Continued)

*Primary Examiner* — Alexander Eisen
*Assistant Examiner* — Nathaniel P Brittingham
(74) *Attorney, Agent, or Firm* — Xsensus LLP

(57) ABSTRACT

An eye-gaze tracker wearable by a user, includes: an infrared irradiation unit to irradiate an eyeball of the user with infrared light; an infrared sensor provided on a lens, the infrared sensor being translucent at least to visible light and to output a signal when the infrared light reflected from the eyeball is incident on the infrared sensor; and processing circuitry to determine a gaze direction of the user based on the signal output from the infrared sensor.

16 Claims, 19 Drawing Sheets

(51) Int. Cl.
G02B 27/01 (2006.01)
G02B 27/00 (2006.01)

(52) U.S. Cl.
CPC ........... *G02B 27/0179* (2013.01); *H04N 5/33* (2013.01); *G02B 2027/014* (2013.01); *G02B 2027/0187* (2013.01)

(56) References Cited

U.S. PATENT DOCUMENTS

| | | | | |
|---|---|---|---|---|
| 2007/0125949 | A1* | 6/2007 | Murata | G01J 1/46 250/338.1 |
| 2008/0074401 | A1* | 3/2008 | Chung | G02F 1/1368 345/175 |
| 2014/0078571 | A1* | 3/2014 | Zuo | G02F 1/09 359/282 |
| 2015/0261003 | A1* | 9/2015 | Morifuji | G09G 3/003 345/8 |
| 2018/0131850 | A1* | 5/2018 | Gustafsson | G02B 27/017 |
| 2019/0113968 | A1* | 4/2019 | Huang | G06F 3/013 |
| 2019/0250707 | A1* | 8/2019 | Kondo | G02B 27/0179 |

OTHER PUBLICATIONS

Karen Strassel, et al., "Squaraine Dye for a Visibly Transparent All-Organic Optical Upconversion Device with Sensitivity at 1000 nm" ACS Appl. Mater. Interfaces 2018, 10, p. 11063-11069.

Jingbi You, et al., "A polymer tandem solar cell with 10.6% power conversion efficiency" Nature Communications vol. 4, Article No. 1446 (2013), Macmillan Publishers Limited. All rights reserved, p. 1-10.

\* cited by examiner

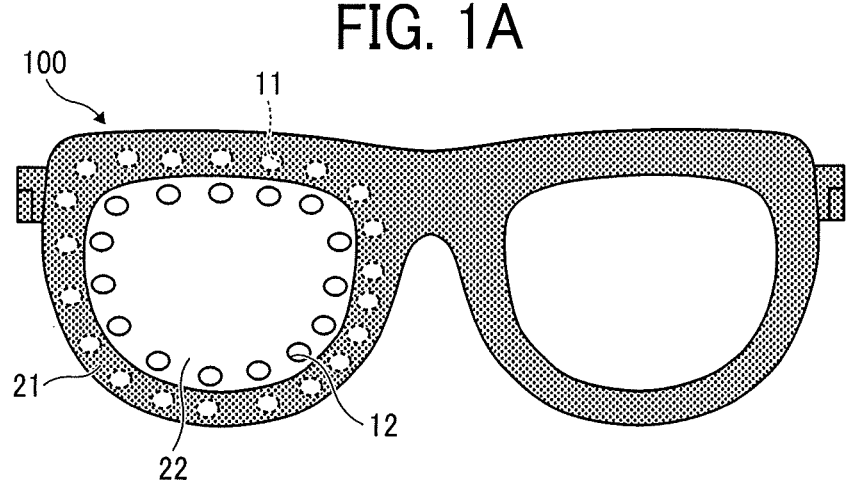
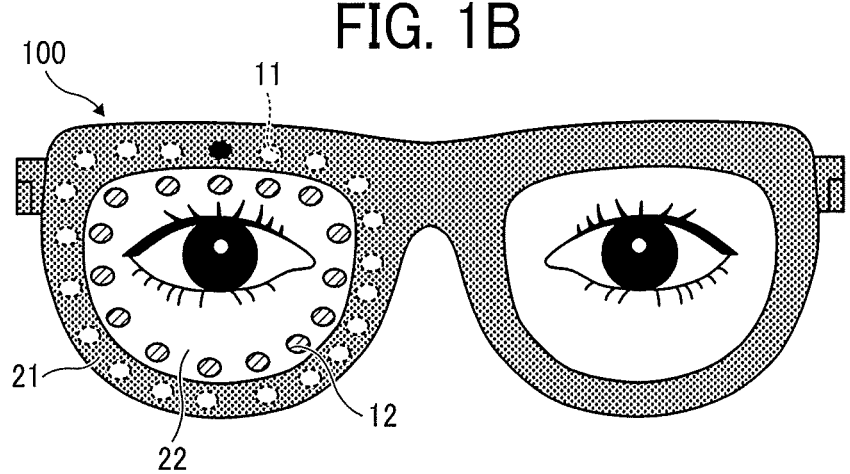
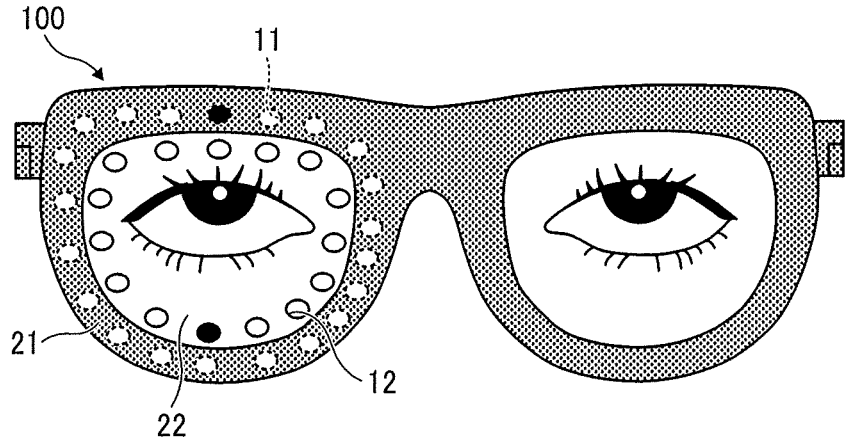

RIGHT

FRONT

DOWN

FIG. 12

| EYE POSITION | RIGHT | | DOWN | | LEFT | | FRONT | | UP | |
|---|---|---|---|---|---|---|---|---|---|---|
| SENSOR POSITION/ GRADATION VALUE | UP | 144 | UP | 174 | UP | 139 | UP | 143 | UP | 148 |
| | UPPER LEFT | 168 | UPPER LEFT | 171 | UPPER LEFT | 154 | UPPER LEFT | 146 | UPPER LEFT | 148 |
| | LEFT | 165 | LEFT | 134 | LEFT | 151 | LEFT | 141 | LEFT | 137 |
| | LOWER LEFT | 162 | LOWER LEFT | 144 | LOWER LEFT | 135 | LOWER LEFT | 136 | LOWER LEFT | 159 |
| | DOWN | 139 | DOWN | 139 | DOWN | 121 | DOWN | 133 | DOWN | 156 |
| | LOWER RIGHT | 137 | LOWER RIGHT | 134 | LOWER RIGHT | 156 | LOWER RIGHT | 133 | LOWER RIGHT | 154 |
| | RIGHT | 143 | RIGHT | 135 | RIGHT | 170 | RIGHT | 139 | RIGHT | 130 |
| | UPPER RIGHT | 144 | UPPER RIGHT | 168 | UPPER RIGHT | 169 | UPPER RIGHT | 141 | UPPER RIGHT | 139 |
| RADAR CHART | (radar chart) | | (radar chart) | | (radar chart) | | (radar chart) | | (radar chart) | |

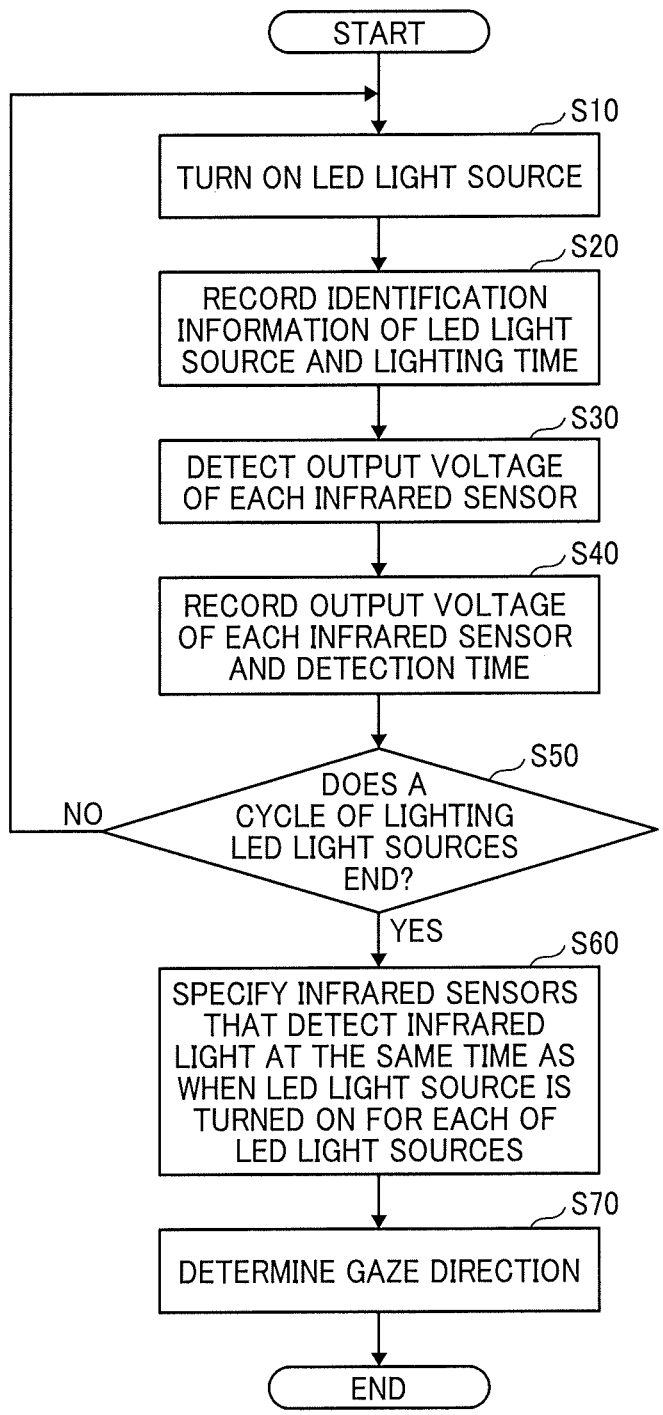

SIMULATION RESULT (FRONT)

FRONT (BINARIZATION)

20° LEFT (BINARIZATION)

20° RIGHT (BINARIZATION)

10° LEFT (BINARIZATION)

10° RIGHT (BINARIZATION)

20° UP (BINARIZATION)

20° DOWN (BINARIZATION)

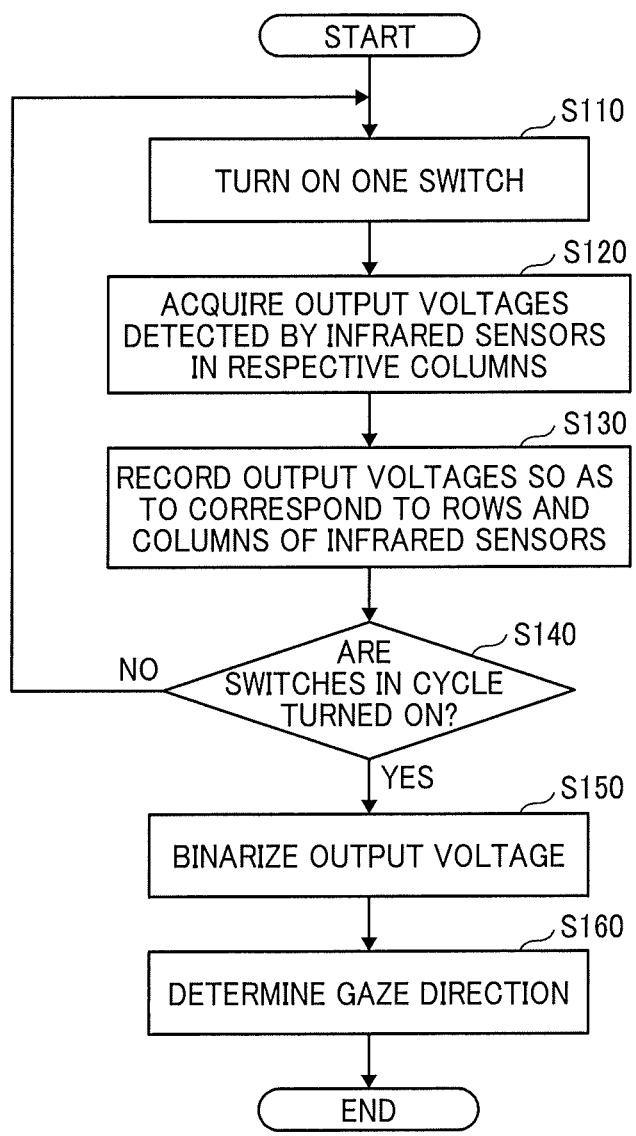

EYE-GAZE TRACKER, EYE-GAZE TRACKING METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-022393, filed on Feb. 9, 2018, and 2018-211766, filed on Nov. 9, 2018, in the Japan Patent Office, the entire disclosure of which is hereby incorporated by reference herein.

BACKGROUND

Technical Field

The present invention relates to an eye-gaze tracker, an eye-gaze tracking method, and a recording medium.

Description of the Related Art

There has been known an eyeglass-type information processing apparatus mainly for entertainment purposes. This information processing apparatus detects movements of a head by an accelerator sensor or a gyro sensor to provide a virtual reality (VR) image based on the orientation of the head. Meanwhile, an eye-gaze tracker in which only an eye-gaze tracking capability is incorporated in the eyeglass-type information processing apparatus is also known. For example, when the eye-gaze tracker is used for marketing purposes, a camera captures a surrounding landscape and information about the landscape is combined with eye-gaze information, so that it is possible to analyze what is there in an eye-gaze direction of a subject and to acquire information such as information about what easily attracts the subject. In addition, the eye-gaze tracking capability enables the position of a mouse to be controllable on a personal computer (PC) or the like.

An eye-gaze tracker that has a VR image viewing capability and an eye-gaze tracking capability has been also developed. The VR image viewing capability and the eye-gaze tracking capability bring about new contents such as an interactive cinema (movie) in which the story changes depending on eye gaze. Moreover, it is possible to achieve foveated rendering (a display system that displays only the center of eye-gaze with high precision and reduces the number of pixels surrounding the center), thus reducing the image processing load of a display capability.

Moreover, an augmented reality (AR) eye-gaze tracker that enables viewing of VR images and visual recognition of the outside world has been developed. The AR eye-gaze tracker is not shut off from the outside world and has a display capability of not completely blocking eye gaze. With the AR eye-gaze tracker, a user can easily walk while viewing map information on a liquid crystal display, for example.

The eye-gaze tracker needs to have a capability of detecting eye gaze. The background technique detects eye gaze from a positional relationship between a reference point acquired by infrared light reflected from a cornea and a moving point such as a pupil.

However, such eye-gaze tracker suffers from design restrictions. This problem will be described with reference to FIG. 25. FIG. 25 is a view explaining a position of a user's eye and a position of a camera. In the background eye-gaze tracker, infrared light is irradiated to an eyeball and a camera 601 (that is sensitive to infrared light) captures the eyeball and infrared light reflected from the eyeball from an oblique direction. For this reason, the distance between the camera 601 and the eye is set long, as indicated by a distance D1. The camera is thus projected forward and eyeglasses become larger in size accordingly. The eyeglasses have to be designed like goggles. To avoid such a situation, it is considered that the distance between the camera 601 and the eye is set shorter, as indicated by a distance D2. However, the camera 601 enters a user's field of view, thus hindering the user.

It is considered to reduce the camera 601 in size. If the camera 601 is reduced in size so as not to be seen at a glance, however, the light receiving area of an image sensor in the camera 601 is reduced accordingly, which may lead to a decrease in sensitivity. If pixels are increased in size in the camera 601 with size restrictions to compensate for the decrease in sensitivity, the number of pixels cannot be increased and thus it is impossible to capture fine images and to accurately track eye gaze. If the eyeglasses are crooked on a user's face, in a case where the camera 601 is small, the positional relationship between the eye, the image sensor, and a light source changes accordingly. As a result, it may be impossible to accurately track eye gaze.

At the present, it is reasonable that the distance between the camera 601 and the eye is long to some extent, but in this case, the camera 601 suffers from design restrictions.

SUMMARY

Example embodiments of the present invention include an eye-gaze tracker wearable by a user, including: an infrared irradiation unit to irradiate an eyeball of the user with infrared light; an infrared sensor provided on a lens, the infrared sensor being translucent at least to visible light and to output a signal when the infrared light reflected from the eyeball is incident on the infrared sensor; and processing circuitry to determine a gaze direction of the user based on the signal output from the infrared sensor.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A, 1B, and 1C illustrate examples of views schematically explaining an operation of an eye-gaze tracker;

FIG. 12 is a table showing an example of detailed simulation results;

FIG. 13 illustrates an example of a flowchart of a procedure in which an eyeglass-type eye-gaze tracker determines a gaze direction;

FIG. 23 illustrates an example of a flowchart of a procedure in which the eyeglass-type eye-tracker determines a gaze direction;

Figure 2:
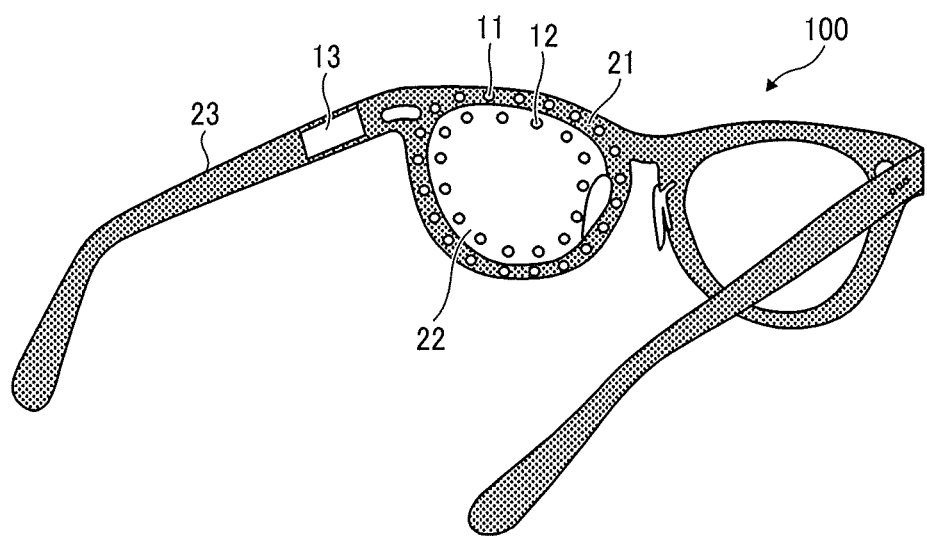
FIG. 2 illustrates an example of a schematic perspective view of the eye-gaze tracker.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Examples of an eye-gaze tracker and an eye-gaze tracking method performed by the eye-gaze tracker will be described hereinafter as an embodiment of the present invention with reference to the drawings. The embodiments provide an eye-gaze tracker with less design restrictions.

First Example

FIGS. 1A, 1B, and 1C illustrate examples of views schematically explaining an operation of an eye-gaze tracker 100 according to this example. FIG. 1A is a front view of the eyeglass-type eye-tracker 100. In the eye-gaze tracker 100, at least one or more LED light sources 11 (an example of an infrared irradiation unit that irradiates infrared light) are arranged on a face side of a rim 21 of the eyeglasses. A plurality of transparent infrared sensors 12 are formed on a face side of a lens 22 to be inside of the rim 21 and along the rim 21. The LED light sources 11 and the infrared sensors 12 are disposed on the face side. While FIGS. 1A, 1B, and 1C illustrate only a configuration of the lens 22 on the right side, the lens 22 on the left side also includes the LED light sources 11 arranged as described above and the infrared sensors 12 formed as described above.

The LED light source 11 and the infrared sensor 12 are connected to a control unit to be described later that is disposed in a temple 23 or the like. The control unit controls turning on of the LED light source 11. The control unit also acquires an output voltage that is output by the infrared sensor 12 upon detection of infrared light.

The distance between the lens 22 and an eye may be equal to the distance between the lens 22 and the eye in common eyeglasses. As the infrared sensors 12 are formed on the lens 22 as illustrated in FIGS. 1A, 1B, and 1C, it is possible to provide the eye-gaze tracker 100 with less design restrictions. The infrared sensor 12 is transparent or at least translucent, and thus user's gaze is not shut off from the outside world and the eye-gaze tracker can be used as augmented reality (AR) glasses. It is needless to mention that the eye-gaze tracker can be also used as virtual reality (VR) glasses in which the user's gaze is shut off from the outside world.

FIG. 1B illustrates an example of a view explaining an example of detecting a gaze direction of a user wearing the eye-gaze tracker 100. FIG. 1B describes turning on of the LED light source 11 and an output voltage of the infrared sensor 12 in a case where a gaze direction is front.

It is assumed that eyeballs face the front. In this case, infrared light irradiated from the LED light source 11 and reflected by the eyeball is incident on the infrared sensors 12 substantially equally. Each of the infrared sensors 12 around the eyeball thus outputs a substantially identical output voltage. That is, there is no infrared sensor 12 that outputs a significantly large output voltage. This relationship does not change regardless of the position of the LED light source 11 to be turned on. Consequently, if there is no infrared sensor 12 that outputs an output voltage higher than or equal to a threshold, it is estimated that the gaze direction is front.

Meanwhile, when the gaze direction is upward (the direction of 12 o'clock) as illustrated in FIG. 1C, infrared light is not incident on the infrared sensors 12 equally and more infrared light reflected by the eyeball tends to be incident on the infrared sensor 12 in the direction of 6 o'clock. This relationship does not change regardless of the position of the LED light source 11 to be turned on. Consequently, it is estimated that the gaze direction is substantially 180 degrees opposite to the infrared sensor 12 that outputs a large output voltage.

More specifically, based on the gaze direction, certain patterns are developed in advance for determining from which infrared sensor 12 in a direction with respect to the LED light source 11 that is turned on a large output voltage is detected and from which infrared sensor 12 in the direction with respect to the LED light source 11 that is turned on a small output voltage is detected. As a result, it is possible to estimate the gaze direction.

According to the eye-gaze tracker 100 of the present embodiment, the transparent or translucent infrared sensors 12 are formed on the lens 22, and thus it is possible to provide the eye-gaze tracker 100 with less design restrictions.

In this disclosure, eyeglasses are constituted by lenses having an eyesight correction function or a ray reduction function and components for enabling the lenses to be attached to a user. While the present embodiment describes the eyeglass-type eye-gaze tracker, the eyesight correction function or the ray reduction function is not required and only the function of enabling lenses to be attached to the user is required. The eyeglass-type eye-gaze tracker may be referred to as a sunglass-type eye-gaze tracker or a goggle-type eye-gaze tracker. The eye-gaze tracker may also have a single lens such as a water glass.

When incorporated in eyeglasses, the eye-gaze tracker 100 may function as an eye-gaze tracker. The eye-gaze tracker that is not incorporated in eyeglasses may be commercially distributed.

Infrared light is a type of light and is an electromagnetic wave whose spectrum is outside the red region. The wavelength of infrared light ranges from 800 nm to 1 mm but may be outside the range. Infrared light may be referred to as infrared radiation, near-infrared light, or near-infrared radiation.

Configuration Example

FIG. 2 illustrates an example of a schematic perspective view of the eye-gaze tracker 100 according to this example. Similarly to FIGS. 1A, 1B, and 1C, the LED light sources 11 are arranged on the rim 21 of a left lens and the infrared sensors 12 are concentrically formed on the left lens 22. The control unit 13 is embedded in a left temple 23. The control unit 13 may be externally mounted on the temple 23 or may be connected to an eyeglass frame via a cable.

While the LED light sources 11 arranged on the rim 21 are embedded in recesses formed in the rim 21 on the side of a user's eye, all or some of the LED light sources 11 may be projected to the side of a user's eye. The LED light sources 11 are preferably arranged to surround the eye. While it suffices that at least one or more LED light sources 11 are arranged, reflected light is easily detected by using a larger number of the LED light sources 11 and thus two through four or more LED light sources 11 may be arranged. Alternatively, only one LED light source 11 may be arranged for the purpose of detecting only a gaze direction that is particularly required to be detected (for example, front and directions other than the front). Alternatively, a single LED light source 11 may be arranged on the rim 21 in a doughnut shape.

The infrared sensors 12 are also preferably arranged on the lens 22 on the side of the user's eye to surround the eye. It may be advantageous to provide more infrared sensors 12 to improve the resolution of the gaze direction to be detected. Alternatively, only one infrared sensor 12 may be arranged for the purpose of detecting only the gaze direction that is particularly required to be detected (for example, front and directions other than the front). It is not necessary that the number of the LED light sources 11 is equal to the number of the infrared sensors 12.

Figure 3:
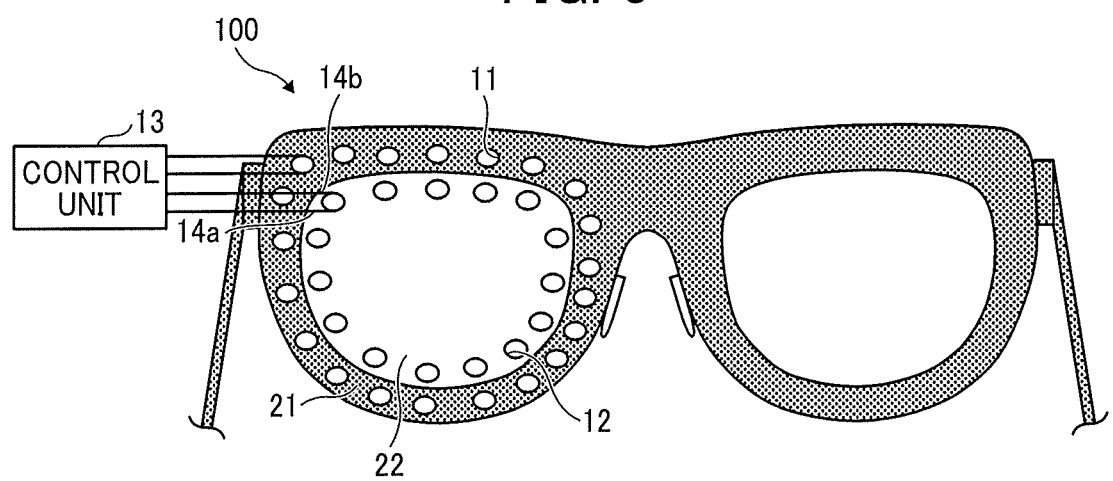
FIG. 3 illustrates an example of a view of a left lens, as seen from a user.

FIG. 3 illustrates an example of a view of the left lens 22 seen from a user. A left temple is omitted in FIG. 3. As illustrated in FIG. 3, the lens 22 includes an anode transparent wire 14a and a cathode transparent wire 14b that electrically connect the control unit 13 to the infrared sensor 12. Not only the infrared sensor 12 but also the wire is transparent and thus it is possible to provide the eye-gaze tracker 100 that prevents a user's field of view from being blocked.

It is only required that the transparent wire 14 conducts electricity from the rim 21 to the infrared sensor 12, and a common metal wire connects the rim 21 to the control unit 13. The transparent wire 14 may be made of indium tin oxide (ITO), a conductive polymer, graphene, or a carbon nanotube.

The LED light source 11 is also electrically connected to the control unit 13, but the LED light source 11 is arranged on the rim 21 (hardly enters the user's field of view). Consequently, it is not necessary that a wire connecting the LED light source 11 to the control unit 13 is transparent.

<Hardware Configuration Example of Control Unit>

Figure 4:
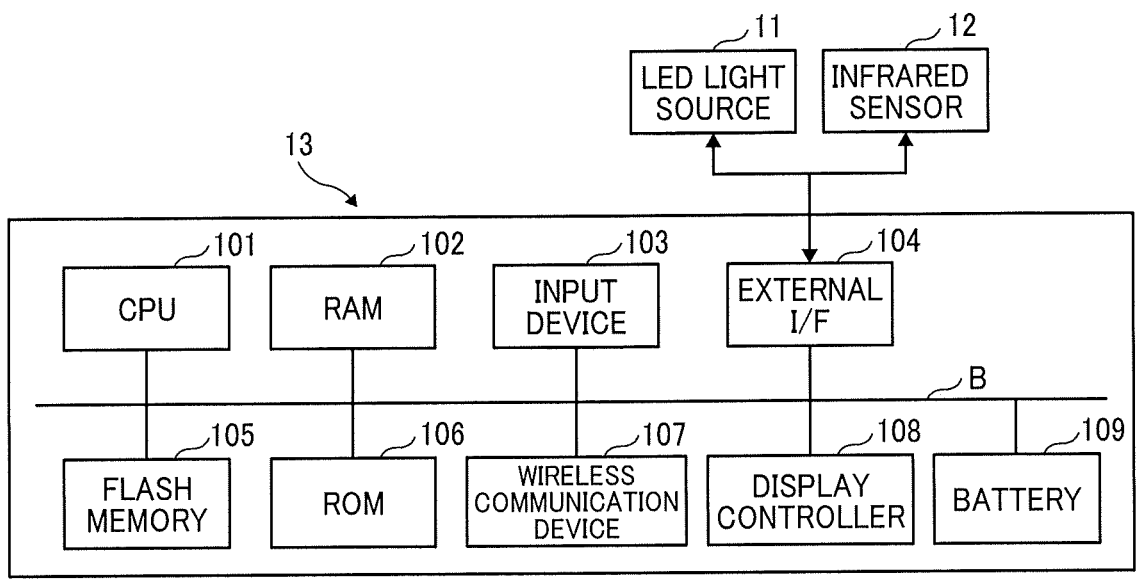
FIG. 4 is a hardware configuration diagram illustrating an example of a control unit.

FIG. 4 is a hardware configuration diagram illustrating an example of the control unit 13 according to the present embodiment. The control unit 13 is an information processing apparatus that analyzes an output voltage to determine a gaze direction. The information processing apparatus may be commonly referred to as a microcomputer, a system on chip (SoC), or an LSI.

The control unit 13 includes a central processing unit (CPU) 101, a RAM 102, an input device 103, an external I/F 104, a flash memory 105, a ROM 106, a wireless communication device 107, a display control device 108, and a battery 109. Hardware components except for the battery 109 are connected to each other by buses B.

The CPU 101 is a computation device that executes programs expanded from the ROM 106 or the flash memory 105 into the RAM 102 to achieve overall control and capabilities of the control unit 13. The ROM 106 is a non-volatile semiconductor memory capable of storing programs and data if a power supply is turned off. A basic input/output system (BIOS) performed when the control unit 13 starts up, an operating system (OS), and the like are stored in the ROM 106. The RAM 102 is a volatile semiconductor memory that temporarily stores programs and data. The flash memory 105 manages the programs and data stored using a predetermined file system or a DB.

The input device 103 is used to allow a user to input operation signals to the control unit 13. The input device 103 includes a switch for turning on and off the power supply, a click button of a mouse, and a hard key, for example.

The external I/F 104 is an interface to an external device. Examples of the external device include the LED light source 11 and the infrared sensor 12. The external I/F 104 outputs a control signal to turn on the LED light source 11 and acquires an output voltage from the infrared sensor 12.

The wireless communication device 107 performs communication with a host device such as a PC, a smartphone, and a tablet terminal using Bluetooth (Registered Trademark), Bluetooth Low Energy, ZigBee (Registered Trademark), near filed communication (NFC), infrared communication, visible communication, and sonic communication. Alternatively, the wireless communication device 107 may communicate with base stations for a wireless LAN and a mobile phone network. The wireless communication device 107 externally acquires image contents and voice contents, and stores these contents in the flash memory 105.

When the eyeglass-type eye-gaze tracker 100 includes a liquid crystal display on the entire lens 22 or a part of the lens 22, the display control device 108 displays an image on the liquid crystal display. For example, when the eyeglass lens is formed by a see-through display (a transparent liquid crystal display), a user can view contents while recognizing the outside world. For example, transparent inorganic EL display TASEL may be used as the see-through display. The battery 109 supplies power to the eye-gaze tracker 100.

By integrating the see-through display with the eye-gaze tracking device, it is possible to not only view images but also operate the display by gaze.

<Forming Infrared Sensor>

Figure 5:
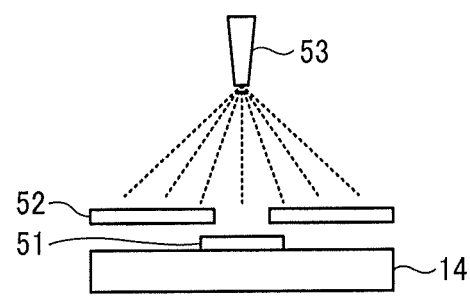
FIG. 5 illustrates an example of a view explaining a method of forming an infrared sensor.

A method of forming the infrared sensor 12 is described with reference to FIG. 5. FIG. 5 illustrates an example of a view explaining the method of forming the infrared sensor 12. The infrared sensor 12 preferably has high transmittance. Assuming that the wavelength of visible light ranges from 400 nm to 700 nm, the average transmittance of light in the range is preferably higher than or equal to 30% and is more preferably higher than or equal to 50%.

Figure 6:
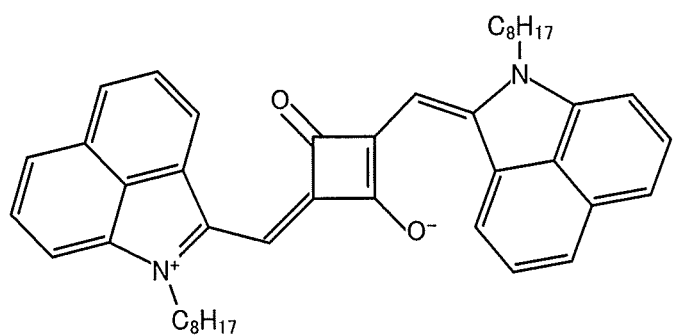
FIG. 6 illustrates an example of a structural formula of a p-type semiconductor included in the infrared sensor.

The infrared sensor 12 of this example is formed by using the following materials, for example.

p-type semiconductor manufactured by Sigma-Aldrich, Octabutoxy-2,3-naphthalocyanine n-type semiconductor manufactured by Frontier Carbon Corporation, PCBM HBL manufactured by Sigma-Aldrich, polyethyleneimine, 80% ethoxylated EBL: MoOx Anode electrode: ITO The p-type semiconductor of the infrared sensor 12 of this example may be formed by using a material illustrated in FIG. 6, for example. The material illustrated in FIG. 6 is described in Karen Strass, et al. "Squaraine Dye for a Visibly Transparent All—Organic Optical Upconversion Device with Sensitivity at 1000 nm" ACS Applied Materials & Interfaces 2018 10 (13), 11063-11069, the entire contents of which is incorporated by reference herein.

Figure 7:
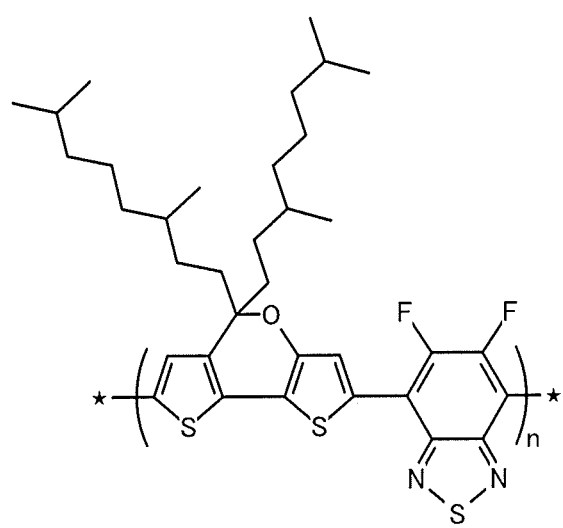
FIG. 7 illustrates an example of a structural formula of the p-type semiconductor included in the infrared sensor.

For example, a material having a structural formula illustrated in FIG. 7 may be used as the p-type material of the infrared sensor 12. The material illustrated in FIG. 7 is described in Jingbi You, et al, "A polymer tandem solar cell with 10.6% power conversion efficiency" Nat Commun. 2013 Feb. 5; 4: 1446, the entire contents of which is incorporated by reference herein.

The infrared sensor 12 is formed by the following procedure, for example. As illustrated in FIG. 5, an ITO electrode 51 is patterned in a predetermined shape on a transparent substrate including the transparent wire 14.

(1) A spray 53 sprays HBL on the transparent substrate using a mask pattern 52 that has an opening at a position where the infrared sensor 12 is formed.

(2) Next, a toluene solution is prepared by mixing the p-type semiconductor with the n-type semiconductor at a weight ratio of 1:3, and the toluene solution is sprayed and applied on the HBL using the same mask pattern and then dried.

(3) The EBL and the anode electrode are successively patterned and deposited using a metal mask by vacuum deposition.

The method of forming the infrared sensor 12 illustrated in FIG. 5 is only an example, and the materials, manufacturers of the materials, and forming procedure are also examples.

<Circuit Configuration>

Figure 8A:
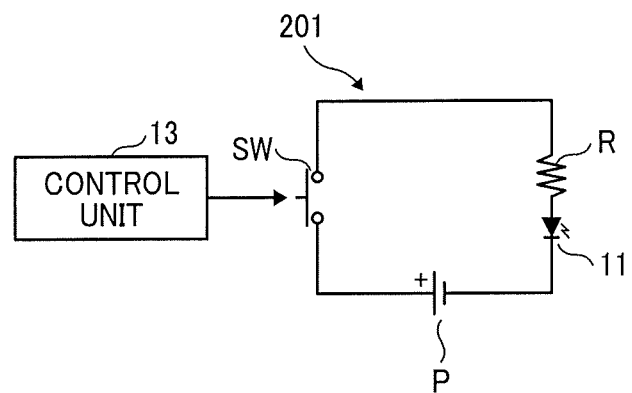
FIGS. 8A and 8B illustrate examples of diagrams explaining configurations of a peripheral circuit for turning on an LED light source and a peripheral circuit related to an output voltage of the infrared sensor.
Figure 8B:
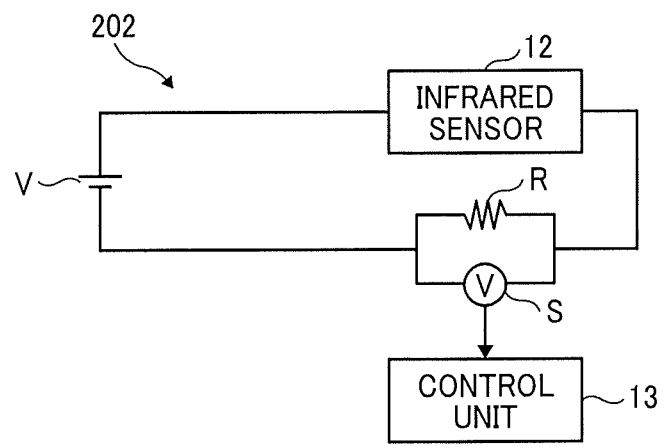

FIGS. 8A and 8B illustrate examples of diagrams explaining configurations of a peripheral circuit for turning on the LED light source 11 and a peripheral circuit related to an output voltage of the infrared sensor 12. FIG. 8A illustrates a lighting circuit 201 of the LED light source 11. The lighting circuit 201 of the LED light source 11 includes a power supply P, a switch SW, a resistor R, and the LED light source 11 that are serially connected to each other. When the control unit 13 turns on the switch SW, a current from the power supply P, which has been limited by the resistor R, flows in the LED light source 11 to cause the LED light source 11 to emit light. While FIG. 8A illustrates only one LED light source 11, all the LED light sources 11 arranged on the rim 21 are subjected to lighting control by a similar lighting circuit 201. The control unit 13 turns on clockwise or counter-clockwise the LED light sources 11 arranged on a circumference of the rim 21 while executing control so that only one LED light source 11 turns on at a time.

Assuming that there are ten LED light sources 11 and each LED light source 11 is turned on at 50 Hz, any of the LED light sources 11 is turned on at 50 Hz×10=500 Hz. If ten LED light source 11 on the circumference of the rim 21 are turned on for the purpose of detecting a gaze direction once, the gaze direction can be detected in a sufficiently short time.

FIG. 8B illustrates an example of a voltage detection circuit 202 that detects an output voltage of the infrared sensor 12. The voltage detection circuit 202 illustrated in FIG. 8B includes a power supply V, the infrared sensor 12, and a resistor R that are serially connected to each other. A voltmeter S is connected in parallel to the resistor R. The power supply V is a bias power supply. When infrared light is incident on the infrared sensor 12, the amount of current flowing in the circuit increases, a potential difference across the resistor R varies according to the increase in current, and this variation is measured by the voltmeter S. It is thus possible to acquire an output voltage generated by infrared light incident on the infrared sensor 12.

<Functions>

Figure 9:
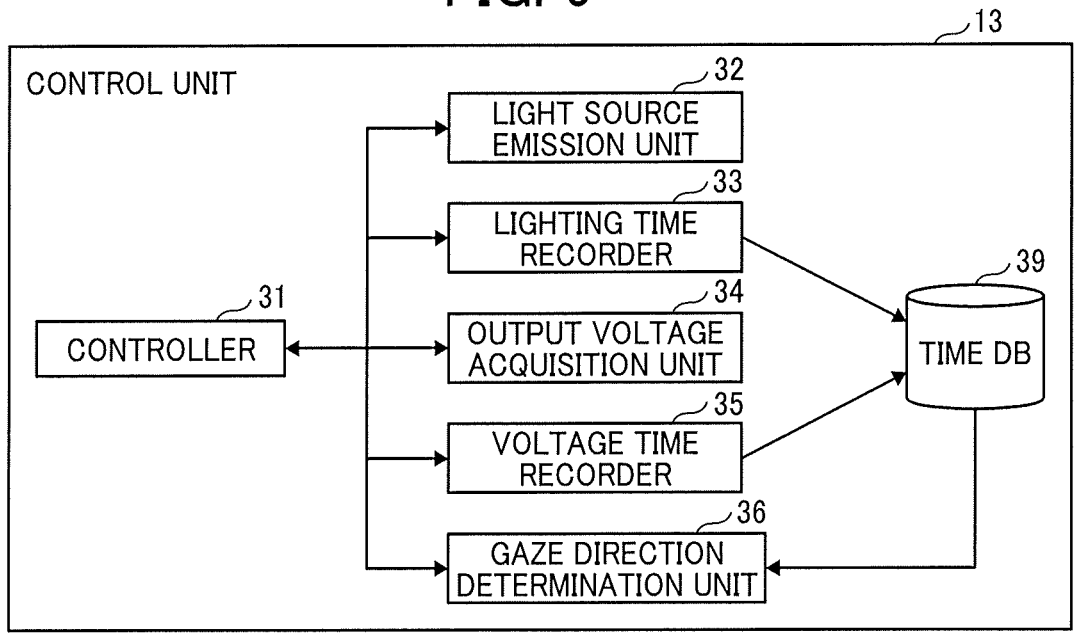
FIG. 9 illustrates an example of a functional block diagram in which functions for eye-gaze tracking included in the control unit are illustrated by blocks.

FIG. 9 illustrates an example of a functional block diagram in which functions of eye-gaze tracking that are included in the control unit 13 are illustrated by blocks. The control unit 13 includes a controller 31, a light source emission unit 32, a lighting time recorder 33, an output voltage acquisition unit 34, a voltage time recorder 35, and a gaze direction determination unit 36. These functions included in the control unit 13 are functions or means that are achieved by any of the components illustrated in FIG. 4 being operated in response to a command from the CPU 101 based on a program expanded from the flash memory 105 into the RAM 102.

The control unit 13 also includes a time DB 29 that is built in the flash memory 105 or the RAM 102 illustrated in FIG. 4.

The controller 31 controls the blocks of the control unit 13 for the purpose of determining a gaze direction, for example. The controller 31 sets a process in which all the LED light sources 11 emit light once as a cycle and the light source emission unit 32 causes the LED light sources 11 to sequentially emit light. The controller 31 causes the gaze direction determination unit 36 to determine the gaze direction after every cycle.

The light source emission unit 32 causes the LED light sources 11 arranged on the rim 21 to sequentially emit light at a predetermined period. The controller 31 may set the period in the light source emission unit 32 or may instruct, as required, the light source emission unit 32 to cause the LED light source 11 to emit light.

The lighting time recorder 33 records a time when the light source emission unit 32 actually causes the LED light source 11 to emit light (or a time when the controller 31 instructs the light source emission unit 32 to cause the LED light source 11 to emit light) and identification information of the LED light source 11 in the time DB 29. The light emission time and the identification information are thus recorded for all the LED light sources 11.

The output voltage acquisition unit 34 acquires an output voltage from each of the infrared sensors 12. The output voltage may be recorded as an analog value or the output voltage that is equal to or higher than a threshold may be detected. In this example, for easy explanation, the analog value of the output voltage is acquired for each of the infrared sensors 12.

The voltage time recorder 35 records the output voltage detected by the infrared sensor 12 and the voltage detection time when the output voltage is detected in the time DB 29. The output voltage is recorded so as to correspond to the identification information of the infrared sensor 12.

The gaze direction determination unit 36 specifies the voltage detection time of the infrared sensor 12 that is close to the light emission time of the LED light source 11 recorded in the time DB 29 after a cycle of emission of the LED light sources 11, and determines the gaze direction based on the output voltage of each infrared sensor 12 that corresponds to the voltage detection time. Details will be described later.

TABLE 1A

| IDENTIFICATION INFORMATION OF LED LIGHT SOURCE | LIGHT EMISSION TIME [ms] |
|---|---|
| 001 | 0 |
| 002 | 2 |
| 003 | 4 |
| 004 | 6 |
| 005 | 8 |
| ... | ... |

TABLE 1B

| VOLTAGE DETECTION TIME [ms] | IDENTIFICATION INFORMATION OF INFRARED SENSOR DETECTING OUTPUT VOLTAGE | |
|---|---|---|
| 0 | 001:135 | 005:142 |
|   | 002:150 | 006:155 |
|   | 003:164 | 007:146 |
|   | 004:145 | 008:131 |
| 2 | 001:142 | 005:132 |
|   | 002:151 | 006:162 |
|   | 003:158 | 007:166 |
|   | 004:176 | 008:143 |
| 4 |   | ... |
| 6 |   | ... |
| 8 |   | ... |
| ... |   | ... |

Table 1A illustrates an example of recording the light emission time in the time DB 29. In Table 1A, the light emission time is recorded so as to correspond to the LED identification information. The light emission time is a relative time in which the start of a cycle is set to zero. An absolute time may be recorded. For example, according to records, the LED light source 11 with the identification information 001 Emits light at 0 milliseconds (at the same time as the start of a cycle) and the LED light source 11 with the identification information 002 emits at 2 milliseconds.

Table 1B illustrates an example of recording the voltage detection time. In Table 1B, the output voltage detected by each infrared sensor 12 is recorded so as to correspond to the voltage detection time. While output voltages of eight infrared sensors 12 are recorded in Table 1B, the number of the infrared sensors 12 is only an example.

When the light emission time in Table 1A and the voltage detection time in Table 1B are the absolute time, the light emission time easily corresponds to the voltage detection time. When the light emission time and the voltage detection time are not the absolute time, if the controller 31 causes the output voltage acquisition unit 34 to sample the output voltage of the infrared sensor 12 substantially simultaneously with the emission of the LED light source 11, the light emission time and the voltage detection time are substantially the same.

The gaze direction determination unit 36 specifies the voltage detection time in Table 1B that is the closest to the light emission time in Table 1A, thus specifying that which infrared sensor 12 outputs an output voltage at the time of emission of which LED light source 11.

The unit of the output voltage is converted to a gradation value for convenience of description. Since the relative difference between numerical values of the infrared sensors 12 is more effective for determining the gaze direction than the absolute numerical value, the gradation value does not cause any problems.

<Example of Detecting Gaze Direction>

Figure 10:
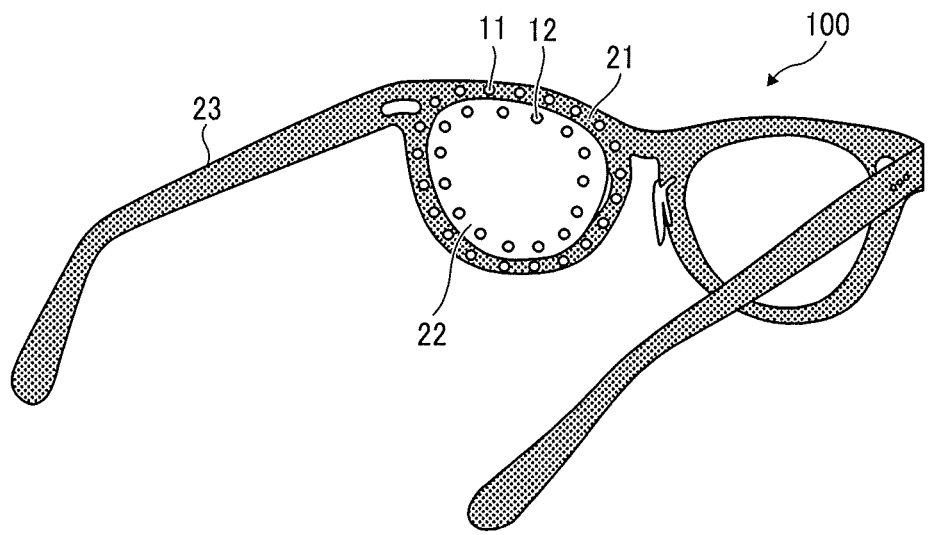
FIG. 10 illustrates an example of a view explaining conditions for simulation.

A method of determining a gaze direction by simulation will be described hereinafter with reference to FIGS. 10 through 12. FIG. 10 illustrates an example of a view explaining conditions for simulation. It is set in the simulation that eight LED light sources 11 are arranged on a face side of the rim 21 of eyeglasses and eight infrared sensors 12 are formed on the lens 22.

Other conditions are set as follows.

Infrared reflectance of the white of an eye is 30% and infrared reflectance of an iris of the eye is 10%.

An eyeball is based on a sphere. Curvature of the white of the eye is R12 and curvature of the iris of the eye is R8.

An axial length of the eye (a maximum length between a surface of the iris of the eye and a surface of the white of the eye) is 25.6 [mm].

A simulator does not sequentially turn on the eight LED light sources 11 one by one for simplicity. The simulator turns on the eight LED light sources 11 at the same time and simulates how infrared light reflected by the surface of the eyeball is detected by the eight infrared sensors 12.

Figure 11A:
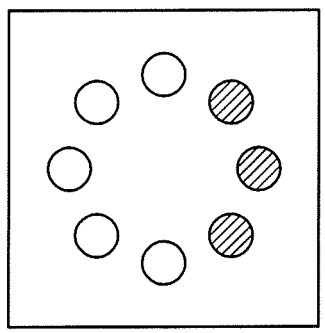
FIGS. 11A, 11B, and 11C illustrate examples of views visually illustrating simulation results.
Figure 11B:
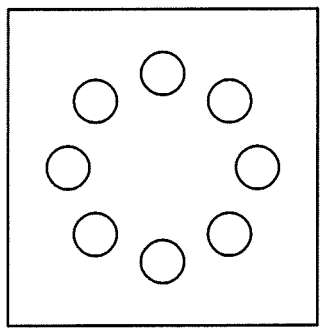
Figure 11C:
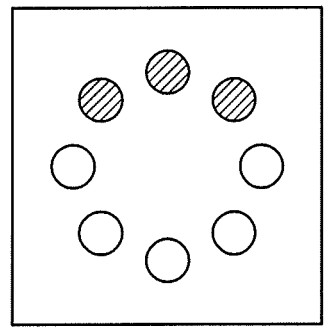

FIGS. 11A, 11B, and 11C illustrate examples of views visually illustrating simulation results. The gaze direction, such as right, front, and down, illustrated in FIGS. 11A, 11B, and 11C are viewed from a user side (eyeglasses side). FIG. 11A illustrates a simulation result when the gaze direction is right. FIG. 11B illustrates a simulation result when the gaze direction is front. FIG. 11C illustrates a simulation result when the gaze direction is down. The simulation results when eight LED light sources 11 are turned on at the same time are equivalent to simulation results when the eight LED light sources 11 are sequentially turned on one by one, output voltages are detected by the eight infrared sensors 12 every time one LED is turned on, and the output voltages are summed up in each infrared sensor after all eight LEDs are turned on (after a cycle). In FIGS. 11A, 11B, and 11C, the output voltage is converted into a gradation value, and the infrared sensor 12 is shown to have larger brightness as the gradation value is larger.

For example, when the gaze direction is right, it is found that the gradation values of the infrared sensors 12 on the left side tend to increase. When the gaze direction is front, it is found that the graduation values of the eight infrared sensors 12 tend to decrease. When the gaze direction is down, it is found that the graduation values of the infrared sensors 12 on the top tend to increase.

FIG. 12 illustrates an example of a table of detailed simulation results. In FIG. 12, graduation values of the infrared sensors 12 are indicated for gaze directions including right, down, left, front, and up. A radar chart is illustrated in the bottom portion of FIG. 12. The radar chart indicates the graduation value of each infrared sensor as a distance from the center, and the graduation values in eight directions in which the infrared sensors 12 are arranged are connected to each other. Consequently, the graduation value on the outer part of the chart has a larger value.

As illustrated in FIG. 12, it is found that the graduation value in the opposite direction to the gaze direction is large and it is possible to detect or track the gaze direction by the eyeglass-type eye-gaze tracker 100 according to the present embodiment.

The gaze direction determination unit 36 may determine, for every cycle, the gaze direction as an opposite direction (second direction) to a direction (first direction) of the largest graduation value. Alternatively, an identifier that machine-learns patterns of graduation values in FIG. 12 from the simulation results or experiments using subjects may be used as the gaze direction determination unit 36.

<Operation Procedure>

FIG. 13 illustrates an example of a flowchart of a procedure in which the eyeglass-type eye-gaze tracker 100 determines a gaze direction. A process of FIG. 13 is repeatedly performed while a power supply of the eye-gaze tracker 100 is turned on.

The controller 31 first causes the light source emission unit 32 to turn on one LED light source 11 (S10). The LED light sources 11 may be turned on in any order as long as the LED light sources 11 arranged on the rim 21 of eyeglasses are turned on in order without any overlap. For example, the LED light sources 11 are turned on clockwise or counterclockwise. Next, the lighting time recorder 33 records identification information of the LED light source 11 and a lighting time in the time DB 29 (S20).

The output voltage acquisition unit 34 detects an output voltage of each of the infrared sensors 12 at a time when the LED light source 11 is turned on or a little after the LED light source 11 is turned on (S30). Alternatively, the output voltage of the infrared sensor 12 may be constantly detected in a period sufficiently shorter than a lighting period of the LED light source 11.

The voltage time recorder 35 converts the output voltage in a gradation value and records the gradation value and the time when the output voltage is detected in the time DB 29 (S40).

The controller 31 determines whether a cycle of turning on the LED light sources 11 ends (S50). If the determination at step S50 is No, the process returns to step S10.

If the determination at step S50 is Yes, the gaze direction determination unit 36 specifies the infrared sensors 12 that detect infrared light at the same time as when the LED light source 11 is turned on for each of the LED light sources 11 (S60). Consequently, when eight LED light sources 11 are arranged and output voltages are detected at the same time as emission of each of the LED light sources 11, eight groups of gradation values can be acquired. Each group includes gradation values of the eight infrared sensors 12.

The gaze direction determination unit 36 determines a gaze direction by the method described with reference to FIG. 12 for each of the groups (S70). As gaze directions in all the groups are not identical to each other, the gaze direction is determined by combining the gaze directions determined in the respective groups. It is thus possible to minimize a difference between an actual orientation of an eye and the gaze direction determined.

The process at step S60 may be omitted and as described with reference to FIG. 12, the gaze direction determination unit 36 may sum up output voltages of each infrared sensor 12 during a cycle, thus detecting the gaze direction.

<Other Arrangement Examples of Infrared Sensors>

Figure 14A:
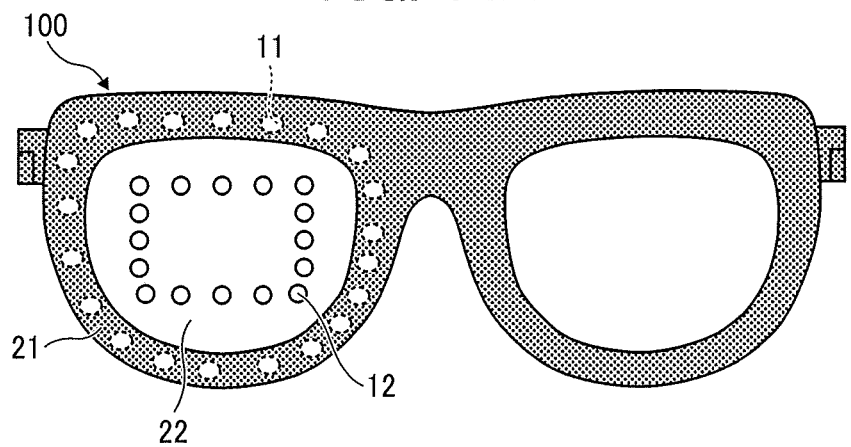
FIGS. 14A, 14B, and 14C illustrate examples of views explaining other arrangement examples of the infrared sensors.
Figure 14B:
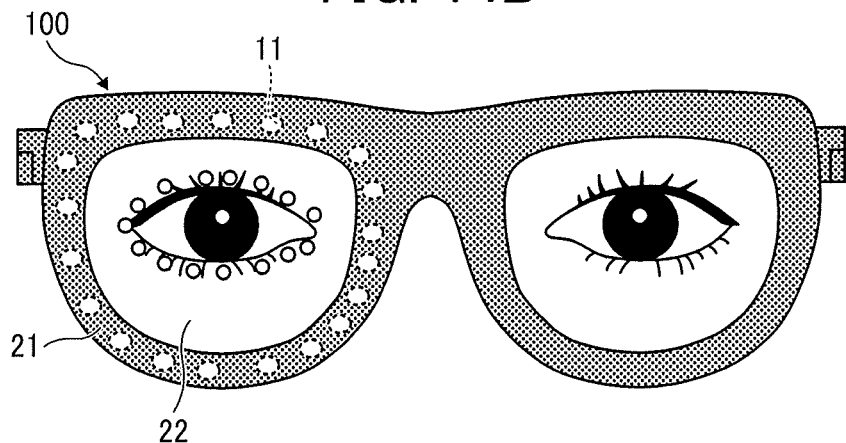
Figure 14C:
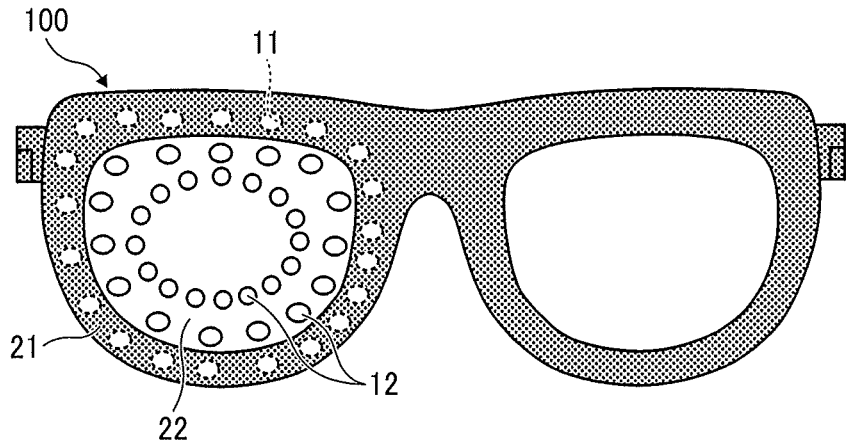

While the infrared sensors 12 are preferably arranged so as to surround an eye, the arrangement of the infrared sensors 12 is not limited to the arrangement examples illustrated in FIGS. 1A, 1B, 1C, and the like. FIGS. 14A, 14B, and 14C illustrate examples of views explaining arrangement examples of the infrared sensors 12. In FIG. 14A, the infrared sensors 12 are arranged in a rectangular (or square) shape regardless of the shape of the rim 21 of eyeglasses. Infrared light reflected from an eyeball travels outside the eye, and thus the infrared light can be detected even when the infrared sensors 12 are arranged in a rectangular shape.

FIG. 14B illustrates an arrangement example of the infrared sensors 12 in which the infrared sensors 12 are arranged along the shape of an eye so that the distance between each infrared sensor 12 and the eye is the shortest. If the infrared sensors 12 are arranged near the eye, infrared light reflected from the eyeball is incident on the infrared sensors 12 with minimal attenuation, and thus the infrared sensors 12 can efficiently detect infrared light.

FIG. 14C illustrates an arrangement example of the infrared sensors 12 in which the infrared sensors 12 are arranged in double circle. In such an arrangement example, infrared light reflected from the eye can be detected by the infrared sensors 12 in inner and outer circles, and thus an improvement in the accuracy of a gaze direction is expected.

As described above, according to the eye-gaze tracker 100 of this example, the infrared sensor 12, which is transparent or translucent, is formed on the lens 22. It is thus possible to provide the eye-gaze tracker 100 with less design restrictions.

Second Example

This example will describe the eye-gaze tracker 100 in which the infrared sensors 12 are arranged on the lens 22 in an array.

Figure 15:
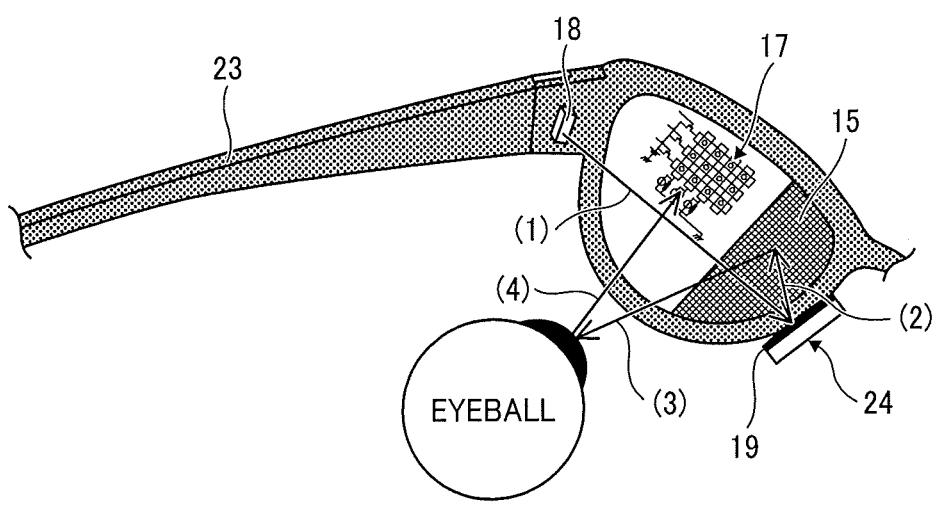
FIG. 15 illustrates an example of a view schematically explaining an operation of an eye-gaze tracker (second example)

FIG. 15 illustrates an example of a view schematically explaining an operation of the eye-gaze tracker 100 according to this example. As illustrated in FIG. 15, a light source unit 18 (an example of an infrared irradiation unit) is disposed on the temple 23 near the lens 22 and a mirror 19 is disposed on a nose pad 24. A low-pass filter 15 is formed in a nose-side area of the lens 22. An infrared sensor array 17 is formed in a center part of the lens 22. Linear or dot-shaped LED light is emitted.

(1) The light source unit 18 irradiates infrared light.
(2) The mirror 19 reflects infrared light to the low-pass filter 15.
(3) The low-pass filter 15 reflects infrared rays to the eyeball.
(4) Infrared light having reached the eye is curved with degree of curvature varying depending on which part of the eye infrared light reaches. This is because a cornea of the eye is curved large and the white of the eye is curved moderate. Infrared light reflected from the eye is incident on the infrared sensor array 17. The irradiation method (1) through (4) described with reference to FIG. 15 is denoted by (i).

The infrared sensors 12 are arranged in a matrix in the infrared sensor array 17. It is thus possible to detect the degree of curvature by finding the infrared sensor 12 that detects infrared light. The control unit 13 holds a pattern in which a gaze direction corresponds to a state of curvature in advance and compares an output voltage detected by the infrared sensor 12 to the pattern, thus determining the gaze direction.

Configuration Example

Figure 16:
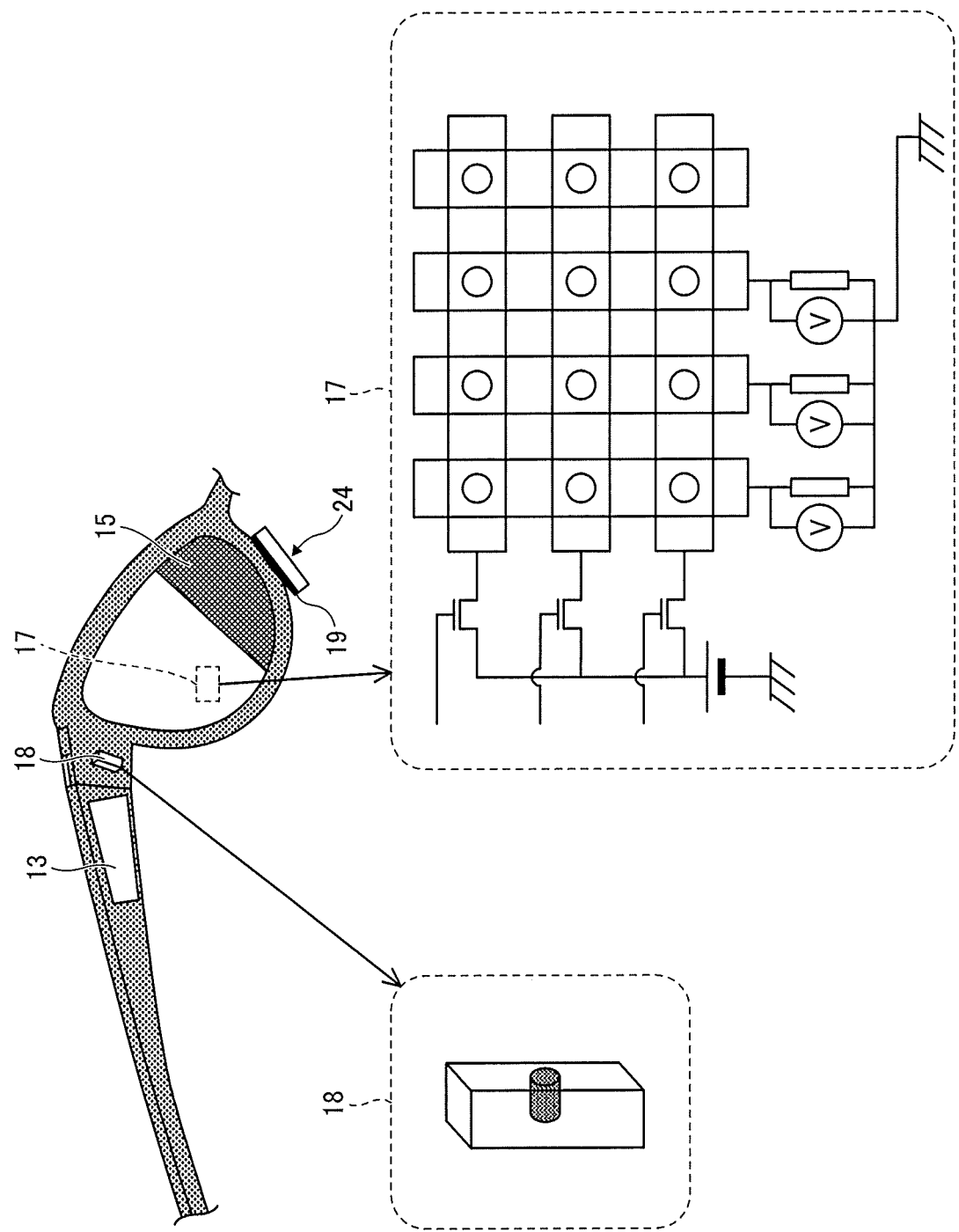
FIG. 16 illustrates an example of a configuration view of an eyeglass eye-gaze tracker.

FIG. 16 illustrates an example of a structural view of the eyeglass-type eye-gaze tracker 100. As described with reference to FIG. 15, the eye-gaze tracker 100 includes the light source unit 18, the mirror 19, the low-pass filter 15, and the infrared sensor array 17, for example. These components will be described in detail below.

Figure 17A:
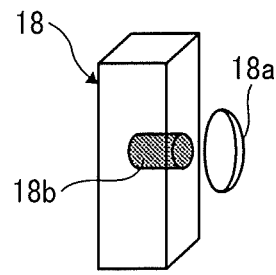
FIGS. 17A, 17B, and 17C illustrate examples of views explaining a configuration of the eyeglass-type eye-tracker.

FIG. 17A illustrates an example of a configuration of the light source unit 18. The light source unit 18 includes a light source 18a and a collimator lens 18b that collects infrared light emitted from the light source 18a and adjusts the infrared light to parallel light (collimated light). As infrared light is adjusted to collimated light, infrared light irradiated from the light source 18a reaches the mirror 19 without spreading. It is thus possible to easily acquire bright line light.

The collimator lens 18b is optional, and a convex lens or a condenser lens may be substituted for the collimator lens 18b.

Figure 17B:
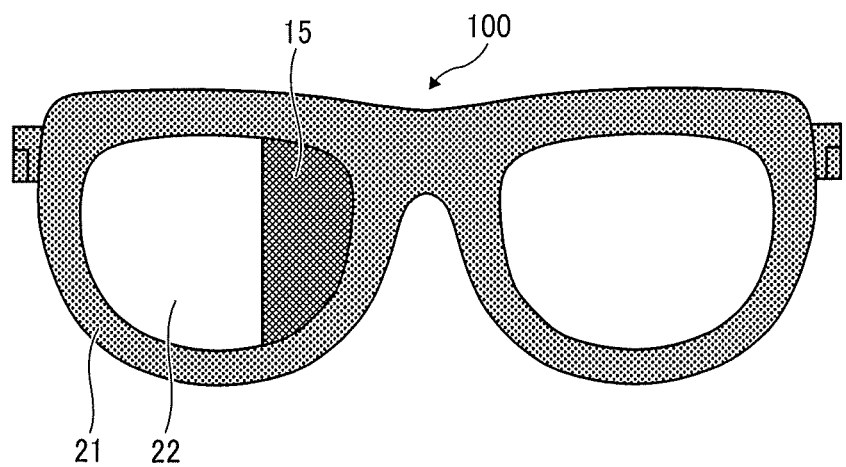

FIG. 17B illustrates an example of the low-pass filter 15.

As an example of the low-pass filter 15, SIO810 manufactured by Asahi Spectra or other filters that have equivalent spectral characteristics to SIO810 may be used. The low-pass filter 15 transmits (low-passes) light having a wavelength of approximately 820 [nm] or shorter and reflects light having a wavelength longer than 820 nm. Consequently, when infrared light is irradiated on the low-pass filter 15, linear or dot-shaped infrared light is formed.

As the infrared sensor array 17 is formed in the center part of the lens 22, the area for the low-pass filter 15 is not so large. If the area of the low-pass filter 15 is small, linear reflected light reflected by the low-pass filter 15 does not have a sufficient width for detecting a gaze direction and may not cover the width of an eye.

Figure 17C:
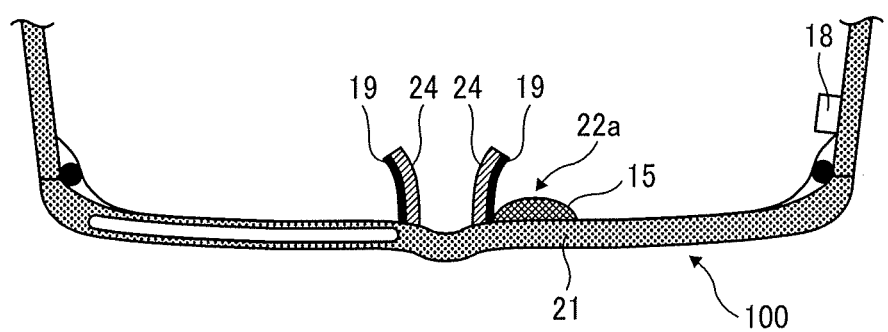

The low-pass filter 15 or the lens 22 on which the low-pass filter 15 is formed is preferably formed in a convex mirror shape. FIG. 17C is a top view of the eyeglass-type eye-gaze tracker 100. In FIG. 17C, the area where the low-pass filter 15 is formed has a convex shape 22a. As the low-pass filter 15 is formed in a convex mirror shape so that light reflected by the convex mirror is expanded, if the area of the low-pass filter 15 is small, linear reflected light is expanded to have a sufficient width for detecting a gaze direction and cover the width of the eye.

As illustrated in FIG. 17C, the mirror 19 is formed on a side of the nose pad 24 at which the lens 22 is placed. It is not necessary that the mirror 19 is formed on the nose pad 24 and it is only required that the mirror 19 reflects infrared light irradiated from the light source unit 18 to the low-pass filter 15. If the nose pad 24 also functions as the mirror 19, however, the mirror 19 is easily disposed in a limited space.

The light source unit 18 may be disposed not on a temple but on the nose pad 24. In this case, the mirror 19 is not required. However, wires connecting the light source unit 18 to the control unit 13 become long.

Figure 18:
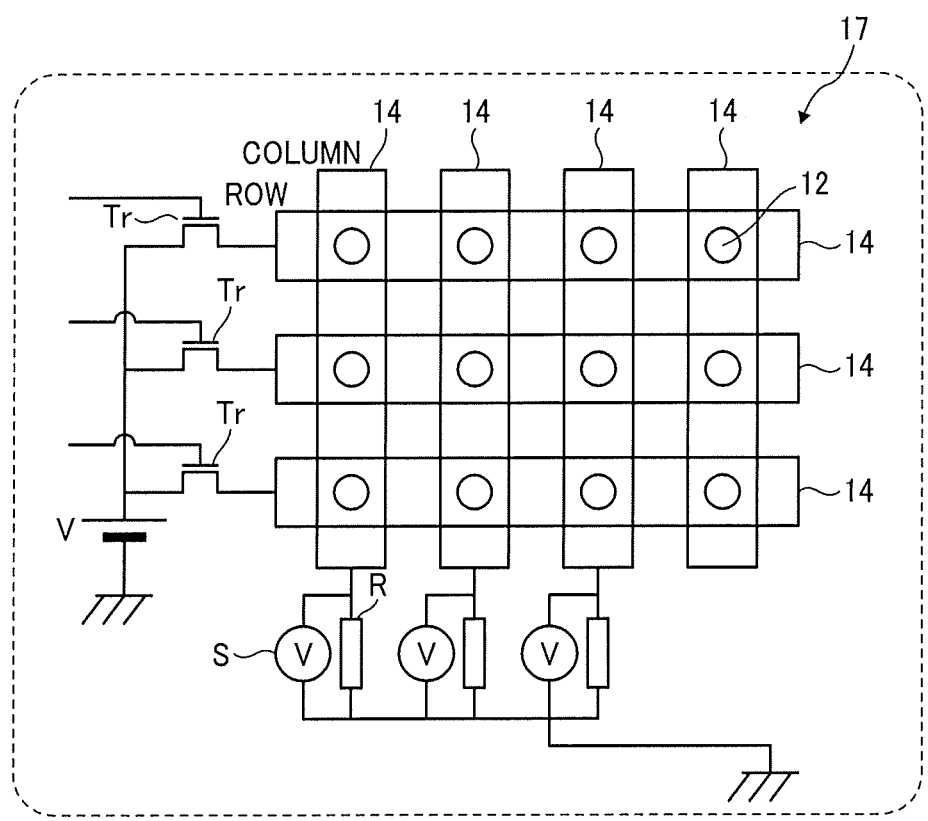
FIG. 18 is an explanatory view illustrating a configuration example of an infrared sensor array.

The infrared sensor array 17 will be described with reference to FIG. 18. FIG. 18 is an explanatory view illustrating a configuration example of the infrared sensor array 17. FIG. 18 illustrates a part of the infrared sensor array 17 taken. A large number of the infrared sensors 12 are formed on the lens 22.

The infrared sensors 12 are formed in the infrared sensor array 17 in a matrix (also referred to as an array or a lattice). The infrared sensors 12 are formed on transparent wires 14 arranged in a row direction and in a column direction. That is, each infrared sensor 12 is formed at an intersection of the transparent wire 14 in the row direction and the transparent wire 14 in the column direction. The transparent wires 14 can thus be electrically connected to the infrared sensors 12 in the row direction and the column direction.

A bias power supply is applied from a power supply V to the infrared sensors 12 in each row. A switch element Tr capable of turning on and off application of the bias voltage is formed between the power supply V and the transparent wire 14 in each row. The switch element Tr is connected to the control unit 13.

A resistor R and a voltmeter S that are connected in parallel to each other are connected to each transparent wire 14 in the column direction. The resistor R is used for detecting an output voltage and the voltmeter S detects a voltage across the resistor. The voltmeter S is connected to the control unit 13.

When only the switch element Tr connected to a certain transparent wire 14 in the row direction is ON and all other switch elements Tr are OFF, only the infrared sensors 12 in the row in which the switch element Tr is ON can detect infrared light. When a plurality of vertical line light beams reflected from an eye reach the infrared sensor array 17, the infrared sensor 12 having detected line light generates an output voltage. The control unit 13 records the output voltage and a row number of the infrared sensor 12.

Next, the control unit 13 turns on only the switch element Tr in another row and turns off all other switch elements Tr. Similarly, the infrared sensors 12 in the row in which the switch element Tr is turned on detect line light and the infrared sensors 12 in the respective columns generate output voltages. The infrared sensors 12 are sequentially turned on a row basis, and thus an incident position of line light in a vertical direction (or other directions), which is reflected from an eyeball, can be captured as a surface.

When the control unit 13 turns on the switch elements Tr in all rows and records output voltages of the infrared sensors 12 in the respective columns, line light that is curved according to irregularities of the eye is incident on the infrared sensors 12. When the infrared sensors 12 outputting high output voltages are coupled to each other, the shape of the infrared sensors 12 coupled is expected to be substantially identical to the shape of line light. That is, by comparing the output voltage to a threshold, it is possible to extract the infrared sensors 12 that form a substantially identical shape to the shape of line light reflected from the eye.

For example, movements of the eyeball are observed at 100 Hz by using 100 rows (scanning lines), the control unit 13 controls a scanning line to turn on the scanning line at 100×100 Hz=10 kHz. It is thus possible to detect a gaze direction once at a speed sufficiently faster than a change in the gaze direction.

<Functions>

Figure 19:
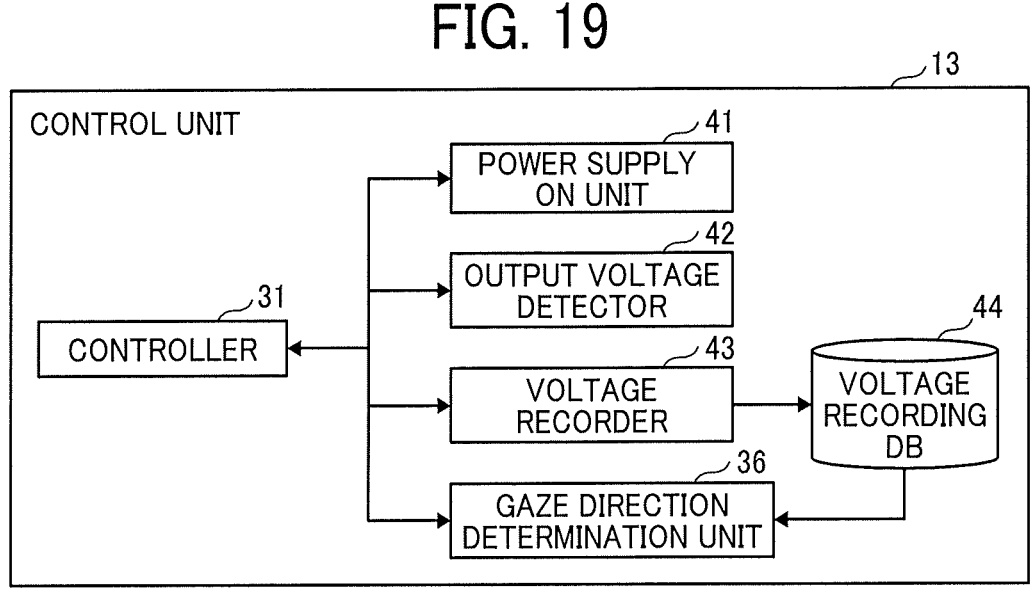
FIG. 19 illustrates an example of a functional block diagram in which functions included in a control unit are illustrated by blocks.

FIG. 19 illustrates an example of a functional block diagram in which functions included in the control unit 13 of this example are illustrated by blocks. The control unit 13 according to this example includes a controller 31, a power supply ON unit 41, an output voltage detector 42, a voltage recorder 43, and the gaze direction determination unit 36. These functions included in the control unit 13 are functions or means that are achieved by any of the components illustrated in FIG. 4 being operated in response to a command from the CPU 101 based on a program expanded from the flash memory 105 into the RAM 102.

The control unit 13 also includes a voltage DB 44 that is built in the flash memory 105 or the RAM 102 illustrated in FIG. 4.

The controller 31 controls the blocks of the control unit 13 for the purpose of determining a gaze direction. The controller 31 sets a process of turning on once the switch elements Tr connected to all rows in the infrared sensor array 17 as a cycle, and causes the power supply on unit 41 to turn on the switch elements Tr. A timing when the switch element Tr is turned on is notified to the output voltage detector 42 and the voltage recorder 43. The controller 31 causes the gaze direction determination unit 36 to determine the gaze direction after every cycle.

The power supply on unit 41 sequentially turns on the switch elements Tr connected to the respective rows in the infrared sensor array 17 in response to an instruction from the controller 31. Only one switch element Tr is turned on at a time. The switch elements Tr may be turned on from the top switch element Tr, the bottom switch element Tr, or the center switch element Tr.

The output voltage detector 42 acquires (samples) output voltages from the infrared sensors 12 in the column direction at a timing when the switch element Tr is turned on. No matter which row in the infrared sensor array 17 is turned on, the infrared sensors 12 in all columns may detect infrared light. The output voltage detector 42 notifies the voltage recorder 43 of a column number and an output voltage. The output voltage may be recorded as an analog value or the output voltage that is equal to or higher than a threshold may be detected. In this example, the output voltage is first recorded as it is, compared to the threshold later, and binarized to 0 or 1, for easy explanation.

The voltage recorder 43 receives the timing when the switch element Tr is turned on from the controller 31 to detect the number of a row that is turned on. In addition, the voltage recorder 43 acquires a column number and an output voltage from the output voltage detector 42. The voltage recorder 43 records the output voltage in the voltage recording DB 44 so as to correspond to the row number acquired from the notification from the controller 31 and the column number acquired from the output voltage detector 42.

The gaze direction determination unit 36 determines the gaze direction after every cycle using information recorded in the voltage recording DB 44.

TABLE 2

| ROW | COLUMN ⟶ | | | | | | | | | | |
|---|---|---|---|---|---|---|---|---|---|---|---|
| ↓ | 66 | 99 | 167 | 142 | 545 | 122 | 45 | 122 | 110 | 91 | ... |
| | 53 | 135 | 156 | 91 | 13 | 141 | 123 | 141 | 67 | 78 | ... |
| | 45 | 122 | 122 | 78 | 45 | 141 | 133 | 67 | 23 | 53 | ... |
| | 123 | 141 | 133 | 23 | 123 | 122 | 142 | 89 | 142 | 45 | ... |
| | 67 | 122 | 142 | 142 | 43 | 54 | 142 | 54 | 67 | 123 | ... |
| | 89 | 110 | 91 | 91 | 78 | 101 | 91 | 156 | 89 | 67 | ... |
| | 54 | 67 | 78 | 78 | 156 | 156 | 78 | 122 | 23 | 78 | ... |
| | 9 | 78 | 23 | 23 | 122 | 122 | 23 | 56 | 142 | 53 | ... |
| | ... | ... | ... | ... | ... | ... | ... | ... | ... | ... | ... |

Table 2 illustrates an example of output voltages recorded in the voltage recording DB 44. Output voltages in Table 2 are gradation values as in the first example. Output voltages in a cycle are recorded in the voltage recording DB 44 so as to correspond to the rows and columns in the infrared sensor array 17. For example, output voltages of the respective columns in a first row are output voltages detected by the infrared sensors 12 in the first row when the switch element Tr in the first row is turned on.

<Example of Detecting Gaze Direction>

A method of determining a gaze direction by simulation will be described hereinafter with reference to FIGS. 20A through 22H.

Figure 20A:
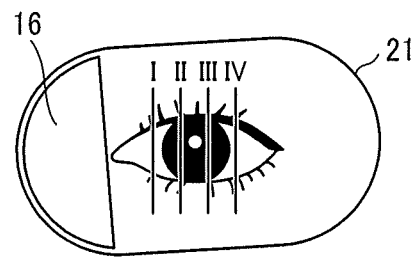
FIGS. 20A and 20B illustrate examples of views explaining an image of detecting a gaze direction.
Figure 20B:
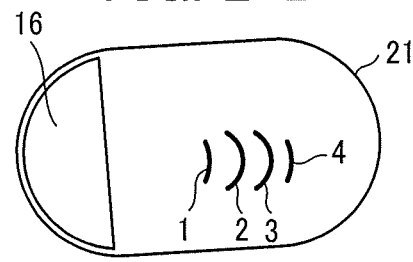

FIGS. 20A and 20B illustrate examples of views explaining an image of detecting a gaze direction. Vertical lines I through IV illustrated in FIG. 20A indicate line light reflected by the low-pass filter 15. In the present embodiment, line light may always be irradiated or may be irradiated only at a timing when the infrared sensor 12 output an output voltage.

FIG. 20B is an imaginary view schematically illustrating an output voltage detected by the infrared sensor 12. In FIG. 20B, the infrared sensors 12 in a column direction that detect an output voltage higher than or equal to a certain level are coupled to each other. A line 1 is for output voltages detected based on line light I, a line 2 is for output voltages detected based on line light II, a line 3 is for output voltages detected based on line light beam III, and a line 4 is for output voltages detected based on line light IV. The lines 2 and 3 are curved according to the curvature of an eyeball. The shapes of the lines 1 through 4 vary depending on the gaze direction. Consequently, by irradiating line light and monitoring an output voltage detected by the infrared sensor 12, it is possible to determine the gaze direction.

The output voltages in FIGS. 20A and 20B are illustrative for easy explanation and it is not necessary to acquire clear curves illustrated in FIG. 20B. If it is impossible to acquire the clear curves, the gaze direction is determined by a pattern of output voltages.

Figure 21:
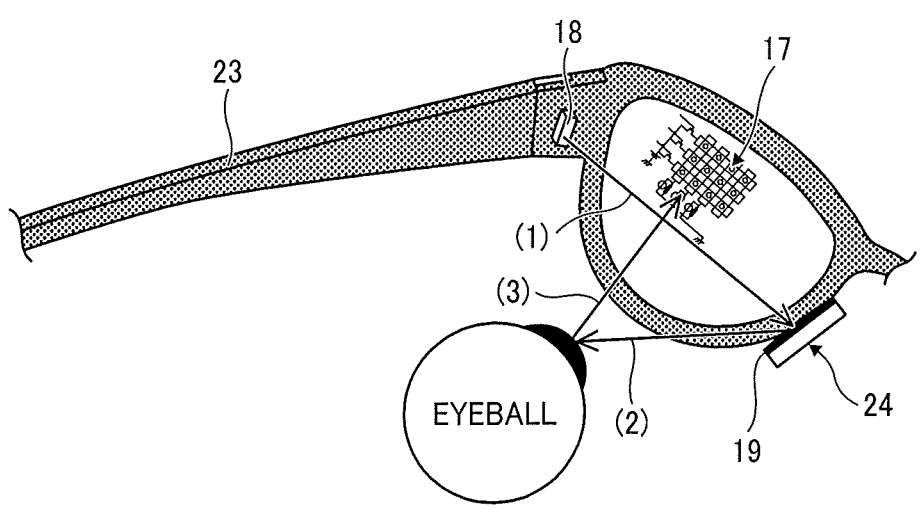
FIG. 21 illustrates an example of a view schematically explaining an operation of an eye-gaze tracker.

While it has been described with reference to FIG. 15 that the gaze direction is detected by line light reflected by the low-pass filter 15, the low-pass filter 15 may be omitted. This will be described with reference to FIG. 21. FIG. 21 illustrates an example of a view schematically explaining an operation of an eye-gaze tracker. In FIG. 21, differences from FIG. 15A will be mainly described. In FIG. 21, the low-pass filter 15 is not disposed on the lens 22. The mirror 19 is attached on the nose pad 24 so as to be directed in a direction of reflecting infrared light irradiated from the light source unit 18 to an eyeball. With this configuration, it is possible to detect the gaze direction by the following infrared irradiation methods.

(ii) Common LED light (having an emission angle of 25°, for example) is used as the light source unit 18. LED light is reflected only by the mirror 19 on the nose pad 24 to be irradiated on the eye.

(iii) Alternatively, linear or do-shaped LED light is reflected only by the mirror 19 on the nose pad 24 to be irradiated on the eye.

Consequently, there are three irradiation methods including the method (i) described above.

FIGS. 22A through 22H illustrate examples of views explaining simulation results. Conditions for simulation are as follows.

The size of an eyeglasses frame is 63 [mm]×38 [mm].

The emission angle of a light source is approximately 25 degrees with respect to the temple 23.

The curvature of the white of an eye is R12 and the curvature of the iris of the eye is R8.

The axial length of the eye (the maximum length between the surface of the iris of the eye and the surface of the white of the eye) is 25.6 [mm].

The reflectance of the mirror 19 on a nose pad is 90%.

A simulator causes the light source unit 18 to emit light, sequentially turns on the switch elements Tr in the row direction one by one, and simulates output voltages detected by the infrared sensors 12 of the respective columns.

Figure 22A:
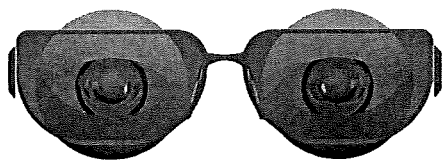
FIGS. 22A through 22H illustrate examples of views explaining simulation results.
Figure 22B:

FIG. 22A illustrates an example of a simulation result when output voltages during a cycle are represented as brightness in a case where eyes face front. Larger brightness (a brighter portion) indicates a larger output voltage. FIG. 22B is a view in which the output voltages in FIG. 22A are binarized to 1 and 0, and 1 is represented by white and 0 is represented by black. With binarization, it is found that the output voltage of the infrared sensor 12 is increased in a certain part.

A threshold for binarization may be experimentally determined so that differences in the gaze direction appear. For example, it may be determined that the number of output voltages converted to 1 is less than or equal to a predetermined number.

Figure 22C:
Figure 22D:
Figure 22E:
Figure 22F:
Figure 22G:
Figure 22H:

FIGS. 22C through 22H illustrate simulation results in which the identical simulation is performed in several directions of gaze. FIG. 22C illustrates a simulation result when the gaze direction is 20 degrees left. FIG. 22D illustrates a simulation result when the gaze direction is 20 degrees right. FIG. 22E illustrates a simulation result when the gaze direction is 10 degrees left. FIG. 22F illustrates a simulation result when the gaze direction is 10 degrees right. FIG. 22G illustrates a simulation result when the gaze direction is 20 degrees up. FIG. 22H illustrates a simulation result when the gaze direction is 20 degrees down.

For example, the location of the infrared sensor 12 that is whiter as having a larger output voltage in FIG. 22C is different from the location of such infrared sensor 12 in FIG. 22D. A difference in the gaze direction between a case of 20 degrees right and a case of 20 degrees left is thus represented by the output voltage. The location of the infrared sensor 12 that is whiter as having a larger output voltage in FIG. 22E is different from the location of such infrared sensor 12 in FIG. 22F. A difference in the gaze direction between a case of 10 degrees right and a case of 10 degrees left is represented by the output voltage. The location of the infrared sensor 12 that is whiter as having a larger output voltage in FIG. 22G is different from the location of such infrared sensor 12 in FIG. 22H. A difference in the gaze direction between a case of 20 degrees up and a case of 20 degrees down is represented by the output voltage.

As the pattern of output voltages detected by the infrared sensors 12 varies depending on the gaze direction, it is possible to track eye gaze. Consequently, the pattern of output voltages that varies depending on the gaze direction is compared to a pattern of output voltages acquired to determine the gaze direction that approximates the pattern. For example, a brightness pattern in which a row number with an output voltage of 1 corresponds to a column number with an output voltage of 1 is prepared in each of 8 or 16 directions. In tracking the gaze direction, the measured pattern is matched against the brightness pattern of each gaze direction. That is, a difference between elements of identical matrices in the measured pattern and in the brightness pattern is calculated and the absolute values of the differences are summed up. The gaze direction of the brightness pattern with the minimum sum is the user's gaze direction. The gaze direction may correspond to the pattern of the output voltage by machine learning. By inputting the pattern of the output voltage to a learning result, it is possible to detect the gaze direction.

<Operation Procedure>

FIG. 23 illustrates an example of a flowchart of a procedure in which the eyeglass-type eye-gaze tracker 100 determines a gaze direction. A process of FIG. 23 is repeatedly performed while a power supply of the eye-gaze tracker 100 is turned on.

The controller 31 first causes the power supply ON unit 41 to turn on the switch elements Tr one by one (S110). The switch elements Tr may be turned on in any order as long as the infrared sensors 12 in all rows are turned on. The switch elements Tr are sequentially turned on from the top switch element Tr or the bottom switch element Tr, for example.

The output voltage detector 42 acquires output voltages detected by the infrared sensors 12 in the respective columns every time when the switch element Tr is turned on (S120).

The voltage recorder 43 records output voltages so as to correspond to rows and columns in the infrared sensor array 17 (S130).

The controller 31 determines whether the switch elements Tr in a cycle are controlled to be turned on (S140). If the determination at step S140 is No, the process returns to step S110.

If the determination at step S140 is Yes, the gaze direction determination unit 36 binarizes the output voltage (S150).

The gaze direction determination unit 36 determines the gaze direction based on patterns of output voltages as described with reference to FIGS. 22A through 22H (S160).

According to the present embodiment, the transparent infrared sensor array 17 is formed on the entire lens surface. Consequently, if eyeglasses are crooked, it is possible to sense light reflected from eyes.

<Cut-Off of External Light>

Figure 24:
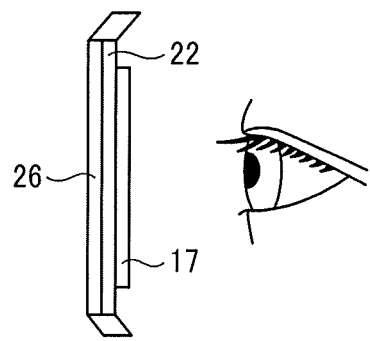
FIG. 24 illustrates an example of a cross-sectional view of a lens.
Figure 25:
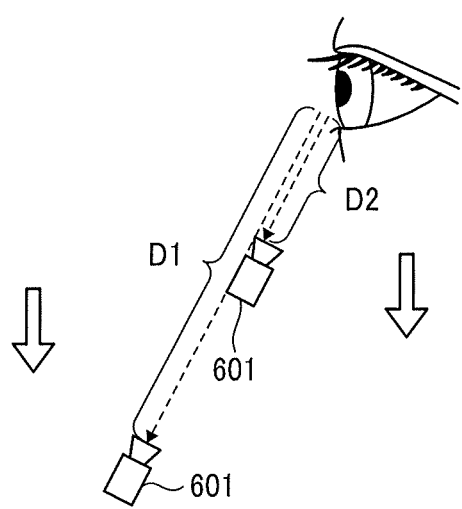
FIG. 25 illustrates an example of a view explaining a position of a user's eye and a position of a camera.

Not only infrared light reflected from an eye but also infrared light contained in external light may be detected by the infrared sensor 12. As illustrated FIG. 24, a low-pass filter 26 that cuts off external light is preferably disposed on the lens 22. FIG. 24 illustrates an example of a cross-sectional view of the lens 22. As illustrated in FIG. 24, the low-pass filter 26 is disposed on the entire surface of the lens 22 opposite to the surface facing the eye. The low-pass filter 26 passes light having a wavelength shorter than infrared light and reflects light having a wavelength longer than infrared light. It is thus possible to reduce misdetection due to external light. Instead of the low-pass filter, a bandpass filter that transmits only visible light may be used. The bandpass filter can cut off ultraviolet light having a wavelength shorter than visible light and thus can reduce influence on the eye.

<Example of Use as Pointing Device>

If a user uses the eye-gaze tracker 100 as a pointing device such as a mouse, the user can operate a display (make inputs on a display). The eye-gaze tracker 100 first communicates with an information processing apparatus such as a personal computer (PC) through near field wireless communication such as Bluetooth (Registered Trademark).

The eye-gaze tracker 100 transmits a gaze direction detected to the information processing apparatus. The information processing apparatus moves a cursor (pointer) in the gaze direction. A click is performed by blinking eyes, for example. A pattern of light reflected from an eyeball changes by blinking, and thus the eye-gaze tracker 100 recognizes blinking to transmit a click signal to the information processing apparatus. Alternatively, the eye-gaze tracker 100 may include a click button.

In addition, to reflect operations such as dragging and zooming to the information processing apparatus, a touch pad is embedded in the temple 23 or a frame of the eye-gaze tracker 100. When an operation of touching the frame is transmitted as a zoom operation to the information processing apparatus for example, it is possible to easily zoom up or down.

As described above, according to the eye-gaze tracker 100 of this example, the infrared sensor 12, which is transparent or translucent, is formed on the lens 22. It is thus possible to provide the eye-gaze tracker 100 with less design restrictions.

While the best mode for carrying out the present invention has been described above using the examples, the present invention is not limited to these examples, and various modifications and substitutions are possible without departing from the spirit of the present invention. For example, elements and/or features of different illustrative embodiments may be combined with each other and/or substituted for each other within the scope of the present invention.

In the configuration examples of FIGS. 9, 19, and the like, the process of the control unit 13 is divided according to the main functions for easy understanding. The invention of the present application is not limited by the method of dividing the process of the control unit 13 into process units or the name of the process unit. In addition, the process of the control unit 13 may be divided into more process units according to the process content. Alternatively, the process of the control unit 13 may be divided so that one process unit includes more processes.

The LED light source 11 or the light source unit 18 is an example of the infrared irradiation unit.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An eye-gaze tracker wearable by a user, the eye-gaze tracker comprising:
    a plurality of infrared irradiation sources that each irradiate an eyeball of the user with infrared light, the plurality of infrared irradiation sources located on a frame;
    a plurality of infrared sensors provided on a lens, each infrared sensor corresponding to an infrared irradiation source of the plurality of infrared irradiation sources, each infrared sensor being translucent at least to visible light and each infrared sensor configured to output a signal in a case that the infrared light reflected from the eyeball is incident on the infrared sensor; and
    processing circuitry configured to
        control the plurality of infrared irradiation sources to sequentially irradiate infrared light one by one so that signals are output from the plurality of infrared sensors; and
        determine a gaze direction of the user based on a pattern of the signals output from the plurality of infrared sensors, wherein
        in a case that at least one of the infrared sensors in a first direction as viewed from the user outputs a signal larger than signals output from other infrared sensors of the plurality of infrared sensors, the processing circuitry determines that the user faces in a second direction opposite to the first direction.

2. The eye-gaze tracker according to claim 1, wherein the plurality of infrared sensors are electrically connected to the processing circuitry via transparent wires that are translucent.

3. The eye-gaze tracker according to claim 1, wherein the plurality of infrared sensors are arranged in a matrix.

4. The eye-gaze tracker according to claim 3, further comprising:
    a low-pass filter provided on at least a part of the lens, wherein
    the infrared light irradiated by the plurality of infrared irradiation sources is linear or dot-shaped, and is reflected by the low-pass filter and then by the eyeball to be incident on the plurality of infrared sensors in the matrix,
    wherein the processing circuitry includes a plurality of switches configured to turn on the plurality of infrared sensors on a row basis, and
    in a case that the switches are turned on, the processing circuitry repeats a process of acquiring the signals from the plurality of infrared sensors in respective columns for every row of the plurality of infrared sensors in the matrix, and acquires a pattern of the signals output by the plurality of infrared sensors.

5. Eyeglasses wearable by the user, the eyeglasses comprising:
    the eye-gaze tracker according to claim 1;
    the frame; and
    the lens.

6. The eyeglasses according to claim 5, further comprising a see-through display.

7. The eye-gaze tracker according to claim 1, wherein
    the lens includes a first surface opposing an eye of the user and a second surface opposite to the first surface, and
    the second surface has a low-pass filter or a bandpass filter that is disposed on an entirety of the second surface.

8. An eye-gaze tracking method performed by an eye-gaze tracker wearable by a user, the eye-gaze tracking method comprising:
    controlling a plurality of infrared irradiation sources to irradiate an eyeball of the user with infrared light, the plurality of infrared irradiation sources being located on a frame;
    acquiring signals output from a plurality of infrared sensors provided on a lens, wherein each infrared sensor corresponds to an infrared irradiation source of the plurality of infrared irradiation sources, each infrared sensor is translucent at least to visible light, and each infrared sensor is outputs a signal in a case that the infrared light reflected from the eyeball is incident on the infrared sensor;
    controlling the plurality of infrared irradiation sources to sequentially irradiate infrared light one by one so that signals are output from the plurality of infrared sensors; and
    determining, by processing circuitry, a gaze direction of the user based on a pattern of the signals output from the plurality of infrared sensors, wherein
    in a case that at least one of the infrared sensors in a first direction as viewed from the user outputs a signal larger than signals output from other infrared sensors of the plurality of infrared sensors, the determining includes determining that the user faces in a second direction opposite to the first direction.

9. A non-transitory recording medium which, when executed by a processor of an eye-gaze tracker wearable by a user, causes the processor to perform an eye-gaze tracking method comprising:
controlling a plurality of infrared irradiation sources to irradiate an eyeball of the user with infrared light, the plurality of infrared irradiation sources being located on a frame;
acquiring signals output from a plurality of infrared sensors provided on a lens, wherein each infrared sensor corresponds to an infrared irradiation source of the plurality of infrared irradiation sources, each infrared sensor is translucent at least to visible light, and each infrared sensor is outputs a signal in a case that the infrared light reflected from the eyeball is incident on the infrared sensor;
controlling the plurality of infrared irradiation sources to sequentially irradiate infrared light one by one so that signals are output from the plurality of infrared sensors; and
determining a gaze direction of the user based on a pattern of the signals output from the plurality of infrared sensors, wherein
in a case that at least one of the infrared sensors in a first direction as viewed from the user outputs a signal larger than signals output from other infrared sensors of the plurality of infrared sensors, the determining includes determining that the user faces in a second direction opposite to the first direction.

10. The eye-gaze tracker according to claim 1, wherein the plurality of infrared irradiation sources includes at least one light emitting diode (LED).

11. The eye-gaze tracker according to claim 1, wherein the processing circuitry is located on the frame.

12. The eye-gaze tracker according to claim 1, wherein the infrared light emitted by the plurality of infrared irradiation sources has a wavelength that is higher than a wavelength of the visible light.

13. The eye-gaze tracker according to claim 1, wherein the plurality of infrared irradiation sources are located on a circumference of the frame so as to surround the lens.

14. The eye-gaze tracker according to claim 13, wherein the plurality of infrared sensors are located on a circumference of the lens at corresponding positions to the plurality of infrared irradiation sources.

15. The eye-gaze tracker according to claim 1, wherein the processing circuitry is further configured to
generate a control signal according to the gaze direction, and
wirelessly transmit the control signal to an information processing apparatus, the control signal for controlling an operation of the information processing apparatus.

16. The eye-gaze tracker according to claim 15, wherein
the information processing apparatus outputs a user interface, and
the control signal operates as a user input to the user interface.

* * * * *